United States Patent
Becher et al.

(10) Patent No.: US 8,255,550 B1
(45) Date of Patent: Aug. 28, 2012

(54) MULTI-PROTOCOL GLOBAL NAMESPACE MECHANISM FOR NETWORK ATTACHED STORAGE

(75) Inventors: Andrew Becher, Rochester, MN (US); Weiye Cheng, Shanghai (CN); Yung-Chieh Stephen Hu, Shanghai (CN); Yisui Hu, Shanghai (CN); Alexei Karaban, Southborough, MA (US); Paul Lemahieu, Pasadena, CA (US); Lixie Liu, Shanghai (CN); Philip Love, Alhambra, CA (US); Fengcheng Lu, Shanghai (CN); Peter Madany, Fremont, CA (US); Ye Zhang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 150 days.

(21) Appl. No.: 12/345,957

(22) Filed: Dec. 30, 2008

(51) Int. Cl.
*G06F 15/16* (2006.01)

(52) U.S. Cl. ..................................... 709/230

(58) Field of Classification Search .................. 709/230, 709/223, 227, 231, 244
See application file for complete search history.

(56) References Cited

U.S. PATENT DOCUMENTS

| | | | |
|---|---|---|---|
| 2005/0125503 A1* | 6/2005 | Iyengar et al. | 709/213 |
| 2006/0080465 A1* | 4/2006 | Conzola et al. | 709/245 |
| 2006/0174127 A1* | 8/2006 | Kalavade et al. | 713/176 |
| 2009/0106255 A1* | 4/2009 | Lacapra et al. | 707/10 |
| 2010/0114889 A1* | 5/2010 | Rabii et al. | 707/737 |
| 2010/0205612 A1* | 8/2010 | Bhatia et al. | 719/314 |

* cited by examiner

*Primary Examiner* — Lan-Dai T Truong
(74) *Attorney, Agent, or Firm* — Dergosits & Noah LLP; Todd A. Noah

(57) ABSTRACT

The present invention provides a system and method for abstracting multiple network attached storage ("NAS") locations, providing a single global namespace and a single mount point that is protocol and location-independent. As a result, rather than identifying each NAS and file server by location, access is provided through a single transparent mechanism. In order to maintain transparency, the present invention provides a way to reconcile the different naming practices for different file server protocols.

14 Claims, 24 Drawing Sheets

---

EMC² Rainfinity — GLOBAL NAMESPACE APPLIANCE

Namespace | Configuration | Reports

[-] Namespace
   [-] Reports
      - Blog
      - Email
      - Wiki
   [+] SantaClara
   [+] NewYork
   [+] Software
   [+] ROOT

[-] All Resources
   [-] Celerra
      [-] /export1
      [-] /export2
      [-] /export3
      [-] Reports Blog
      [-] Reports Email
      [-] Reports Wiki
   [+] CIFSCEL080

| Name | Namespace Path | Resource Path | Protocol | GNS-Linked | Type |
|---|---|---|---|---|---|
| /export1 | | \\Celera\Reports | NFSv3 | true | Export |
| /export2 | | | NFSv3 | true | Export |
| /export3 | | | NFSv3 | false | Export |
| Reports Blog | | | CIFS | true | Share |
| Blog | /Reports/Blog | | CIFS | | Link |
| Email | /Reports/Email | | CIFS | | Link |
| Wiki | /Reports/Wiki | | NFSv3 | | Link |

| EMC² Rainfinity | GLOBAL NAMESPACE APPLIANCE | | | | | |
|---|---|---|---|---|---|---|
| | Namespace | Configuration | | Reports | | |

[-] Namespace
  [-] Reports
    - Blog
    - Email
    - Wiki
  [+] SantaClara
  [+] NewYork
  [+] Software
  [+] ROOT

[-] All Resources
  [-] Celerra
    [-] /export1
    [-] /export2
    [-] /export3
    [-] Reports Blog
    [-] Reports Email
    [-] Reports Wiki
  [+] CIFSCEL080

| Name | Namespace Path | Resource Path | Protocol | GNS-Linked | Type |
|---|---|---|---|---|---|
| /export1 | | \\Celera\Reports | NFSv3 | true | Export |
| /export2 | | | NFSv3 | true | Export |
| /export3 | | | NFSv3 | false | Export |
| Reports Blog | | | CIFS | true | Share |
| Blog | /Reports/Blog | | CIFS | | Link |
| Email | /Reports/Email | | CIFS | | Link |
| Wiki | /Reports/Wiki | | NFSv3 | | Link |

FIG. 2

MULTI-PROTOCOL GLOBAL NAMESPACE MECHANISM FOR NETWORK ATTACHED STORAGE

FIELD

The present invention relates generally to network attached storage, and specifically, to managing and accessing network attached storage regardless of protocol.

BACKGROUND

Network attached storage ("NAS") is a common way for organizations to store and manage data separately from the client computers that are creating and accessing the data. NAS includes devices, computers, filers and other types of file servers connected over a network, as shown in FIG. 1A. Client computers 111 will have access to the network and will thereby be able to interact with these file servers 121. Since more than one computer is likely to access a file server, each file server is known as a "shared resource," and each set of files and directories made available to client computers 111 is known as a "network share" or "share." A client computer accesses a file stored on a file server by referring to a mapping index that provides a host name or IP address, share name or export name, or other location information for the share containing the requested file. For example, client computer 101 of FIG. 1A will need to know the mapping information of a share on file server 131 in order to access to access any files stored in that share.

It is not uncommon for an organization to manage a number of different file servers. Over time, these file servers may be replaced or joined by additional file servers. Similarly, file servers may be taken off the network for repair, retirement or other reasons. Also, shares may be created, deleted, merged, and/or split. These changes to the network and file servers significantly affect the mapping indices used by client computers to access respective file servers. Every time the NAS configurations change, the client computers need to update their mapping indices in order to maintain proper access to associated shares. Although network information service (NIS) servers may provide updated mapping information for some NAS clients, they may not be usable by all clients and may also be difficult to maintain consistently. While distributed file system (DFS) servers do automate access for some NAS clients, they are unusable by other clients. What is therefore needed is a more efficient and universal way to manage mapping information for file servers regardless of their locations on the network.

One will appreciate that file servers may be accessed over the network by using different protocols, the two most common being CIFS and NFS. Data stored for CIFS access on a file server will be organized and accessed differently than data stored for NFS access. Additionally, the mapping information for the different protocols is generated, stored, maintained and accessed differently depending upon the protocol used. As a result, client computers accessing shares on a CIFS file server will not be able to use the same techniques to access shares on a NFS file server. As such, some client computers may be configured to only access shares on a CIFS file server, or configured to only access shares on a NFS file server. As shown in FIG. 1A, some of the client computers may be configured to only use NFS, and so may only be able to access NFS file servers. Similarly, some client computers may be configured to only use CIFS, and so may only be able to access CIFS file servers. One will appreciate that there are some file servers and even some client computers that can support both CIFS and NFS protocols, i.e., multi-protocol file servers and client computers. However, access between multi-protocol client computers and file servers still requires different mapping information depending upon the protocol used, and multi-protocol access is not necessarily seamless.

One will appreciate that mapping information may comprise more than simply direct access to a host or IP address. Some mapping information may include what are known in the art as "referrals." For example, some NAS protocols support referrals (e.g. DFS) whereby a client can request that a server provide access to a named file, and the server can refer that client to another server, which actually contains the named file.

Other NAS protocols may not support referrals. Clients using such protocols often retrieve NAS mapping information from another server such as a NIS server. For example, in FIG. 1A, client 101 may be a client that only uses non-referral-based NAS protocols and uses zero or more NAS mapping NIS servers 141. Client 105 may be a client that only uses referral-based NAS protocols and uses zero or more NAS referral servers 143. Client 103 may be a client that uses both referral- and non-referral-based NAS protocols and use zero or more NAS referral servers 143 and NAS mapping NIS servers 141. Servers 131 and 135 may be servers that implement a single NAS protocol. Server 133 may be a server that implements multiple NAS protocols. The addition of various mapping NIS servers 141 and/or referral servers 143, as well as the presence or absence of file servers having different protocols complicates access between client computers 111 and file servers 121.

What is therefore needed is a way to provide access from client computer to file server, regardless of the protocol used and the type of file server on the network.

BRIEF DESCRIPTION OF THE FIGURES

The present invention is illustrated by way of example and not limitation in the Figures of the accompanying drawings, in which like references indicate similar elements, and in which:

FIG. 2 is an exemplary screenshot illustrating an embodiment of the present invention.

DETAILED DESCRIPTION

The present invention is a system and method for providing a single abstraction layer, or namespace that transparently maps the client computer to any share on any file server on the network. Using the present invention, client computers accessing shares on the network need only pass through a single gateway that provides unified namespace access to all shares, regardless of location and protocol.

It should be appreciated that the present invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. System Architecture

Figure 1A:
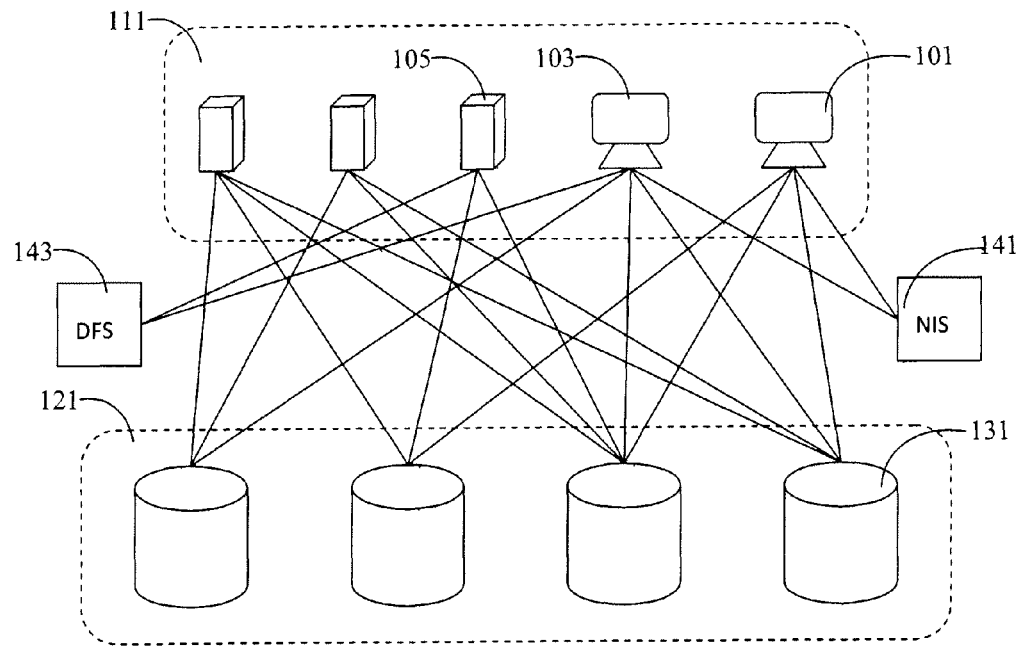
FIG. 1A is an exemplary block diagram depicting a prior art client-file server configuration.
Figure 1B:
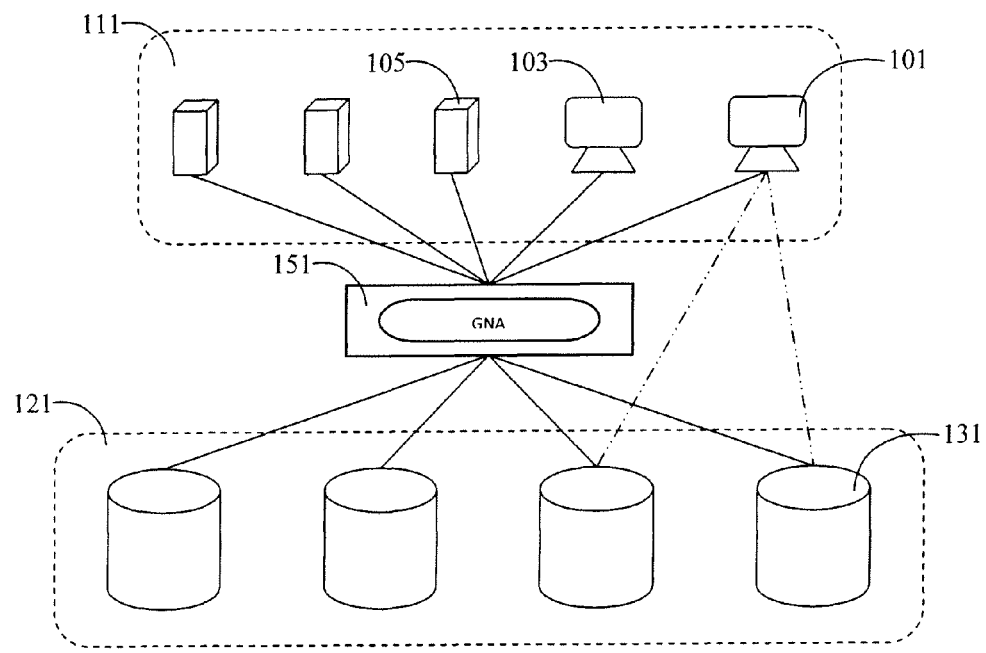
FIG. 1B is an exemplary block diagram depicting an embodiment of the present invention.

FIG. 1B illustrates how the present invention differs over prior art client computer-file server configurations. One will appreciate that the system architecture depicted in FIG. 1B is merely exemplary, and that other configurations are possible without departing from this disclosure or the scope of the present invention. In an embodiment, the system embodiment of the present invention comprises a namespace computer 151 (also referred to as a "Global Namespace Appliance" or "GNA") attached to the network with access to one or more NAS devices or file servers 121, and one or more client computers 111. GNA 151 can be any type of computer or server connected to the network and having memory, so long as it is capable of running the software embodiment of the present invention. For example, GNA 151 may be an x86-based server computer running the Linux operating system. Other platforms may be used so long as they possess the necessary processing power to perform the method disclosed herein.

In an embodiment, file servers 121 may utilize the CIFS, NFS or other file server protocols. Regardless of the protocol used, GNA 151 provides client computers 111 with a single conduit for accessing any of the file servers 121 for NAS protocols that do not support referrals. If client computer 101 wishes to access a share on file server 131, it can send a request to GNA 151, which will resolve access to the share on file server 131, regardless if file server 131 is replaced and its shares moved to another file server. GNA 151 will be able to direct requests and maintain access to any of the file servers even if the file server configuration changes. One will appreciate that any one of client computers 111 may still access any one of the file servers 121 without passing through GNA 151, and the addition of GNA 151 to the network does not interfere with previously established network pathways. Furthermore, for referral-based NAS protocols, clients frequently direct many NAS operations directly to file servers after receiving referrals from the GNA 151. This is illustrated by the broken lines connecting client computer 101 to two of the file servers 121 in FIG. 1B. As FIG. 1B illustrates, GNA 151 may provide the same function as the NAS referral servers and/or NAS mapping NIS servers shown in FIG. 1A, and is therefore easier to manage and more convenient than prior art NAS mapping information.

The software running on GNA 151 may provide a graphical user interface for accessing file servers 121. Alternatively, each of the client computers 111 may install software that enables access to GNA 151, and this installed software may provide a graphical user interface. In an embodiment, GNA 151 is accessible using a web browser. As shown in FIG. 2, the graphical user interface may present a window or similar screen that enables management of the unified namespace for shares on file servers 121 by using a directory tree, spatial file manager, navigational file manager or other file directory navigator similar to Windows Explorer, Apple Mac OS X Finder or GNOME Nautilus. The present invention's graphical user interface is a simpler way to navigate and manage a namespace for shares on different file servers than is presently available in the prior art, since it provides a visual abstraction of file servers 121 such that they appear connected at a single mount point on any client computers 111. As such, the present invention provides client computers 111 with a single global namespace for accessing all of the file servers 121 connected to GNA 151.

Figure 3:
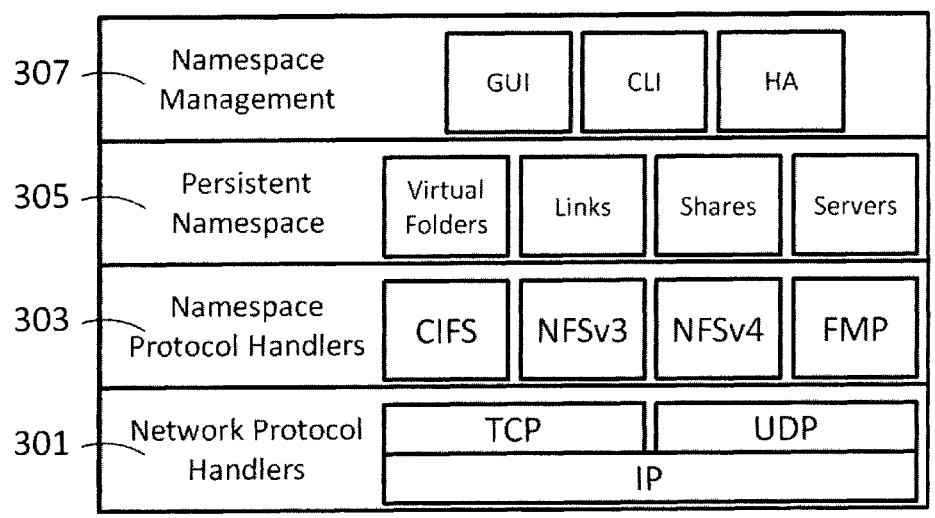
FIG. 3 is an exemplary block diagram depicting an embodiment of the present invention.

In an embodiment, GNA 151 may implement a layered approach in order to manage communications between client computers 111 and file servers 121. As shown in FIG. 3, these layers may include a Network Protocol Handlers layer 301, a Namespace Protocol Handlers layer 303, a Persistent Namespace layer 305, and a Namespace Management layer 307.

The Network Protocol Handlers layer 301 may be responsible for passing data packets between from the physical network and the Namespace Protocol Handlers layer 303. The Namespace Protocol Handlers layer 303 may be responsible for making the unified namespace available to client computers 111 that are connected to GNA 151 using any supported protocol. Namespace Protocol Handlers layer 303 communicates with connected client computers 111 via the Network Protocol Handlers layer 301, and uses information stored in the Persistent Namespace layer in order satisfy client computer requests. For example, if a client using the CIFS protocol requests access to a link in the namespace, the CIFS protocol handler will retrieve the associated link from the Persistent Namespace layer 305 and direct the client to corresponding share.

The Persistent Namespace layer 305 stores information that is necessary to provide clients 111 with access to file servers 121 through a single, unified namespace in GNA 151. As such, it may contain information about virtual folders, links, shares, and file servers and the like. The Persistent Namespace layer 305 may also contain information about the relationships between those entities, such as the relationship between links and shares. The Namespace Management layer 307 may be comprised of components that allow clients to create, alter, and delete the namespace entities stored in the Persistent Namespace layer 305. It may provide a graphical user interface such as that shown in FIG. 2, or it may provide a command line interface to those clients for their convenience. The Namespace Management layer 307 may also contain components that are used to provide high-availability (HA) features such as backup and recovery scripts, as well as automated failover mechanisms.

B. Protocol Handler

The layered architecture illustrated in FIG. 3 is one way the present invention manages access to various file servers 121 connected through a single unified namespace on GNA 151. As discussed above, the present invention receives requests for file server objects in the form of requests from a client computer. The requests may be in the form of a packet or similar unit of data received over the network by GNA 151. Alternatively, requests may be streamed to GNA 151. Packets may include requests for access to a file share, requests for a file stored in a file share on a server, or other remote procedure call ("RPC"). Regardless of how GNA 151 receives requests, these requests may be in the form of a CIFS, NFS or other protocol, all of which are understood by the present invention. In other words, the present invention is able to receive and fulfill requests regardless of protocol. As a result, client computers need only access file servers through GNA 151, resulting in a single access point, or namespace, to all the file servers on the network.

In order to illustrate how GNA 151 may respond to various requests for access from client computers 111 to file servers 121, FIGS. 4 through 28 illustrate some exemplary steps that may be performed by GNA 151 when a particular message is received. One will appreciate that the steps illustrated in FIGS. 4 through 28 are merely exemplary, and are not meant to limit the present invention in any way.

Figure 4:
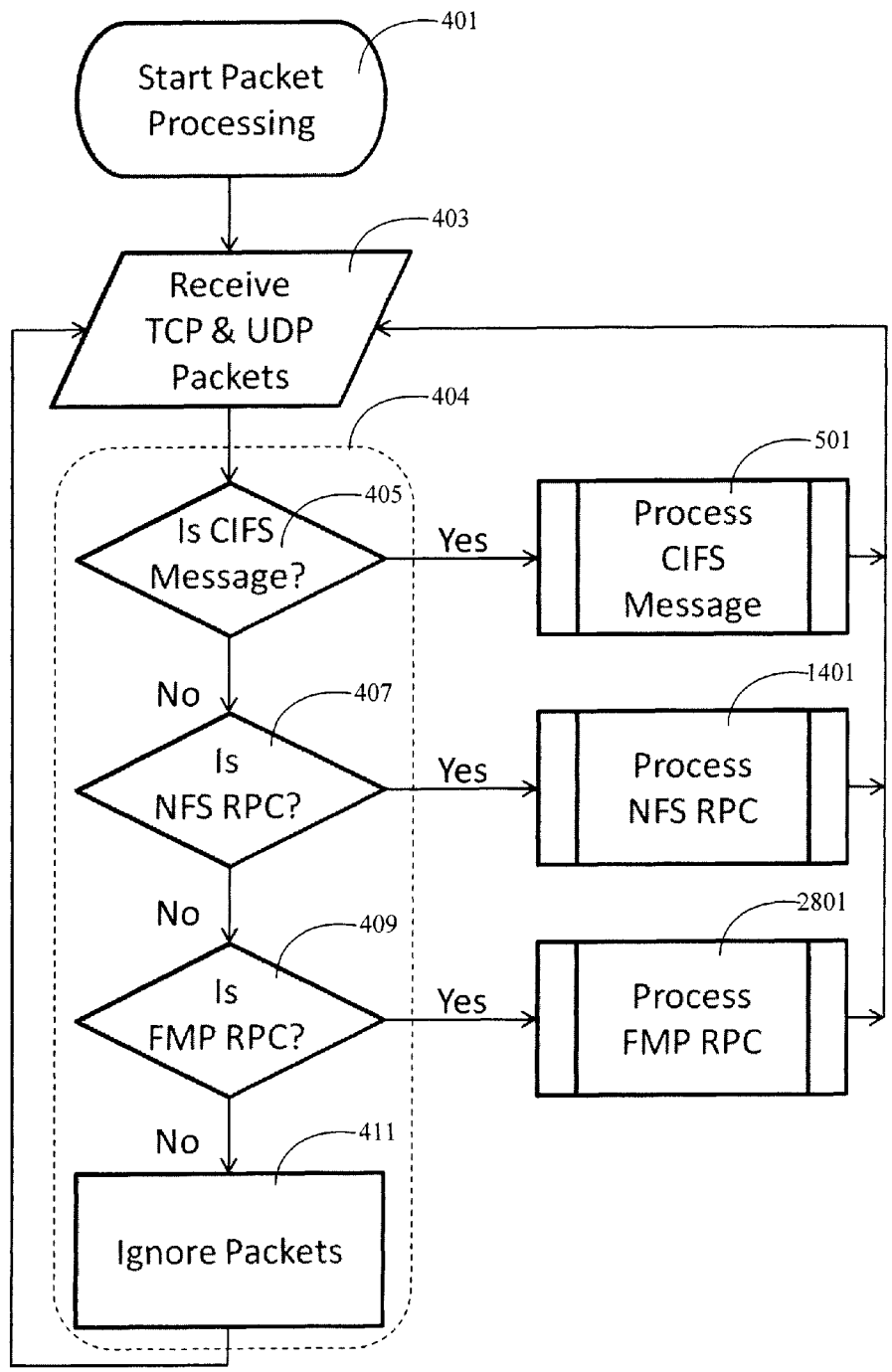
FIG. 4 is an exemplary flow diagram illustrating the steps of an embodiment of the present invention.

FIG. 4 illustrates a general method by which GNA 151 may treat received requests, RPCs, messages, etc., in the form of packets. In step 401, GNA 151 will begin packet processing. In step 403, GNA 151 may begin to receive packets over TCP and/or UDP using Network Protocol Handlers 301. In step 404, these packets are passed to the Protocol Handler Layer 303 to determine the protocol of the packet and direct it to the appropriate protocol handler module. One will appreciate that there are a number of ways to detect the protocol of an incoming message or RPC. For example, Ethernet packets typically contain header information or other metadata that identifies the protocol and version of the associated data. Alternatively, the header may contain a destination port number that may be used to distinguish the protocol family. The format of the packet itself may also identify the protocol. Any of these methods may be employed by the present invention so that GNA 151 may identify the protocol of the received packet in order to pass the packet to the appropriate protocol handler module for further processing.

Figure 5:
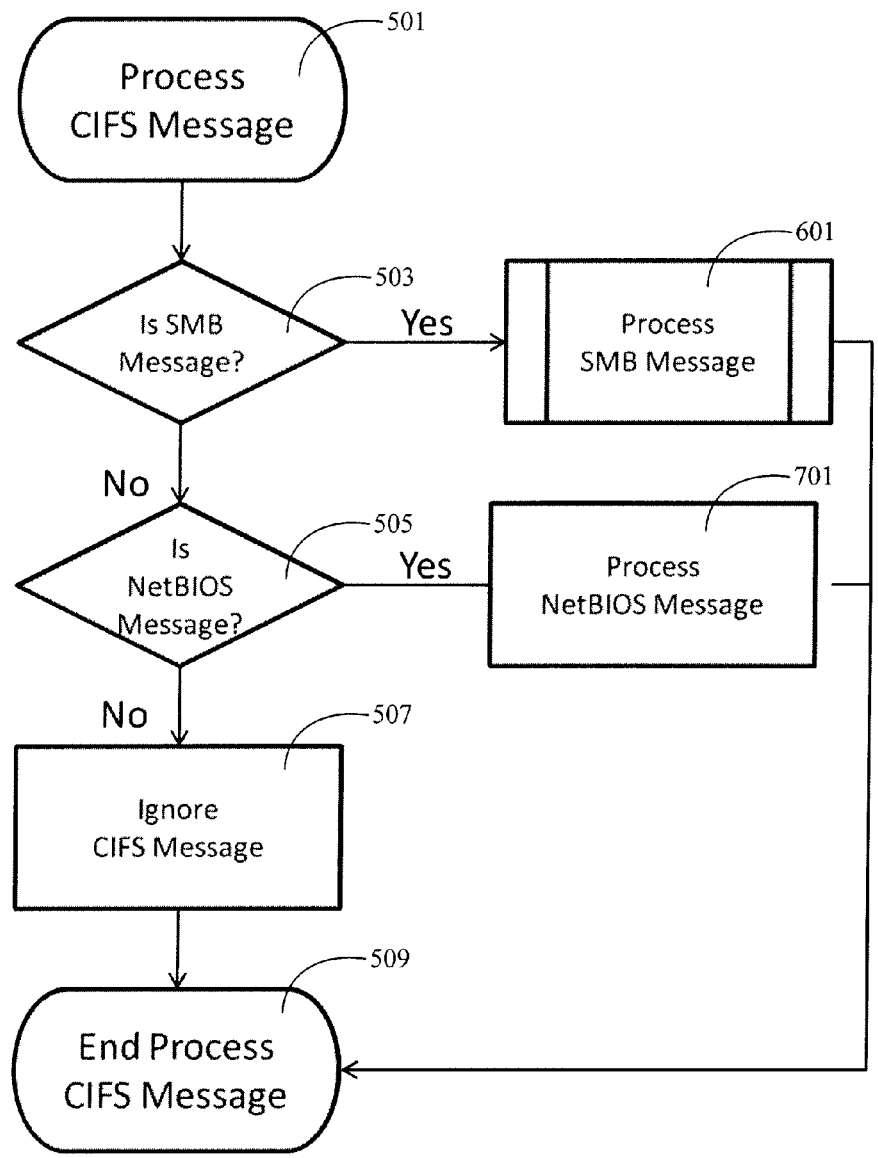
FIG. 5 is an exemplary flow diagram illustrating the steps of an embodiment of the present invention.

For example, in step 405, the received packet may be a CIFS message, which may then be passed to a CIFS message processing module (step 501, see FIG. 5). Alternatively, in step 407, the received packet may be a NFS RPC or message, which would then be passed to a NFS message processing module (step 1401, see FIG. 14). Similarly, in step 409, the received packet may be in the form of some other file mapping protocol ("FMP") such as the Multi-Protocol File System protocol ("MPFSi"), which would then be passed to a FMP message processing module (step 2801, see FIG. 28).

One will appreciate that for each protocol, GNA 151 may have a specific processing module for processing the received message, and that any number of packets in any known protocol may be received by GNA 151, so long as GNA 151 has been installed with the appropriate protocol handler module. Modules may also be combined such that they handle multiple protocols instead of using a dedicated module for each protocol. Modules may also be divided so that they handle requests, RPCs or messages relating to a specific protocol. Further, modules may form part of the software running on GNA 151, or may exist separately from the GNA 151 software and may be called or run when the respective protocol is detected. Examples of the processing methods that may be used by the various protocol handler modules are discussed in the following section.

If GNA 151 receives a packet that it cannot process using any of its protocol handler modules, then in step 411, the packet will be ignored. In an embodiment, GNA 151 may store a log of ignored packets so that an administrator can determine whether additional protocol handler modules should be installed. In an embodiment, GNA 151 may send an alert to an administrator with information on ignored packets.

1. CIFS Message Processing

FIG. 5 illustrates an example of CIFS message processing by a CIFS protocol handler module in GNA 151. One will appreciate that there are a number of commands and messages particular to the CIFS protocol. For example, a CIFS message may be a Server Message Block ("SMB") message or a Network Basic Input/Output System ("NetBIOS") message. In step 501, once GNA 151 detects a CIFS message, then in step 503, the CIFS protocol handler module may determine if the CIFS message is a SMB message. If the message is a SMB message, then in step 601, the SMB message will be processed (see FIG. 6). On the other hand, if the message is not a SMB message, then in step 507, the CIFS protocol handler module may determine if the CIFS message is a NetBIOS message. If the message is a NetBIOS message, then in step 701, the NetBIOS message will be processed (see FIG. 7). This may include acknowledging all NetBIOS session requests and keep-alive packets, and rejecting all other NetBIOS messages. Alternatively or additionally, other NetBIOS messages may also be recognized and processed by the present invention. In any case, once a CIFS message is categorized and processed accordingly, the method shown in FIG. 5 may cease (step 509).

In an embodiment, the present invention may be limited to processing SMB or NetBIOS CIFS messages. In this instance, if the CIFS message received by GNA 151 is neither a SMB or NetBIOS message, then the message may be ignored (step 507) and CIFS message processing may cease (step 509).

Figure 6:
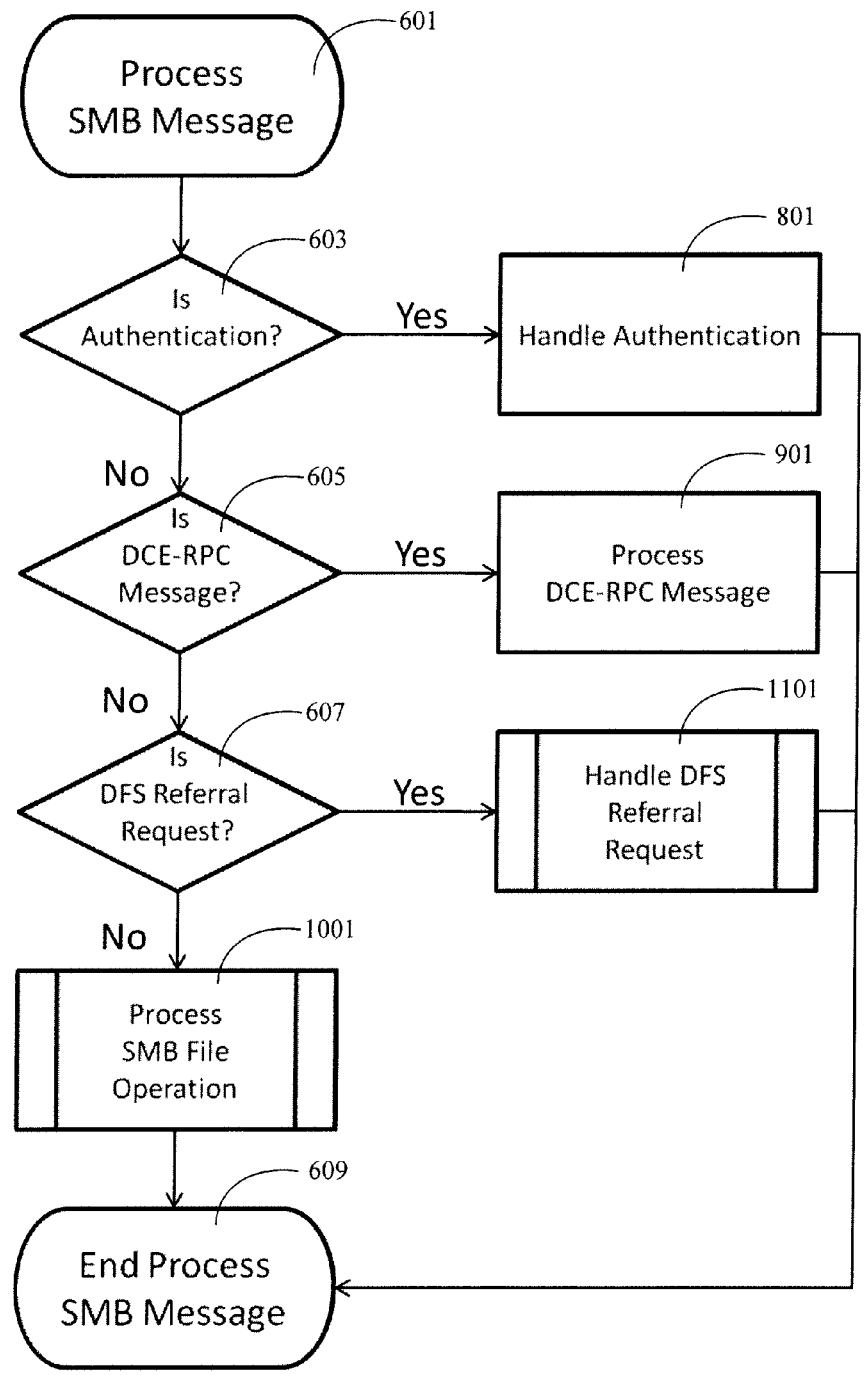
FIG. 6 is an exemplary flow diagram illustrating the steps of an embodiment of the present invention.

FIG. 6 shows how a SMB message is processed. These steps may be performed by GNA 151, the CIFS protocol handler module or a separate module, such as a dedicated SMB message processing module. FIG. 6 continues from step 601 shown in FIG. 5. In step 603, the SMB message is analyzed to see if it involves authentication. If the SMB message does involve authentication, then in step 801, authentication is performed using known methods, such as Kerberos, NTLM, NTLMv2 and the like. Unknown requests for authentication may be rejected if GNA 151 is not configured to handle such requests.

If the SMB message does not involve authentication, then it may be analyzed to see if it is a distributed computing environment RPC ("DCE/RPC" or "DCE-RPC") message (step 605). If the SMB message is a DCE-RPC message, then in step 901, it is processed accordingly. For example, an embodiment of the present invention may be configured to process DCE-RPC binding requests, pipe operations, and other DCE-RPC messages known in the art. For example, GNA 151 may be configured to process a request for workstation information ("NetrGetWkstaInfo"), a request for server information ("NetrGetSrvInfo"), a request for a list of file server shares ("NetrEnumShare"), a request for a Windows registry ("winreg") or others. If GNA 151 does not understand the RPC service request, then a "PATH_NOT_FOUND" message or a similar error message may be returned, however, one will appreciate that GNA 151 is not limited to any specific set of RPC messages.

In an embodiment, the SMB message being processed in FIG. 6 may not be a DCE-RPC message; therefore, it may be analyzed to see if it is a distributed file system ("DFS") referral request (step 607). If the SMB message is a DFS referral request, then the request is handled (step 1101, see FIG. 11). In an embodiment, the SMB message may request a file operation, in which case it will be processed accordingly (step 1001). Various SMB vile operations are discussed below with reference to FIG. 10. If the SMB message does not fall within any of these types, then it may be ignored and the SMB message processing will conclude (step 609).

Figure 7:
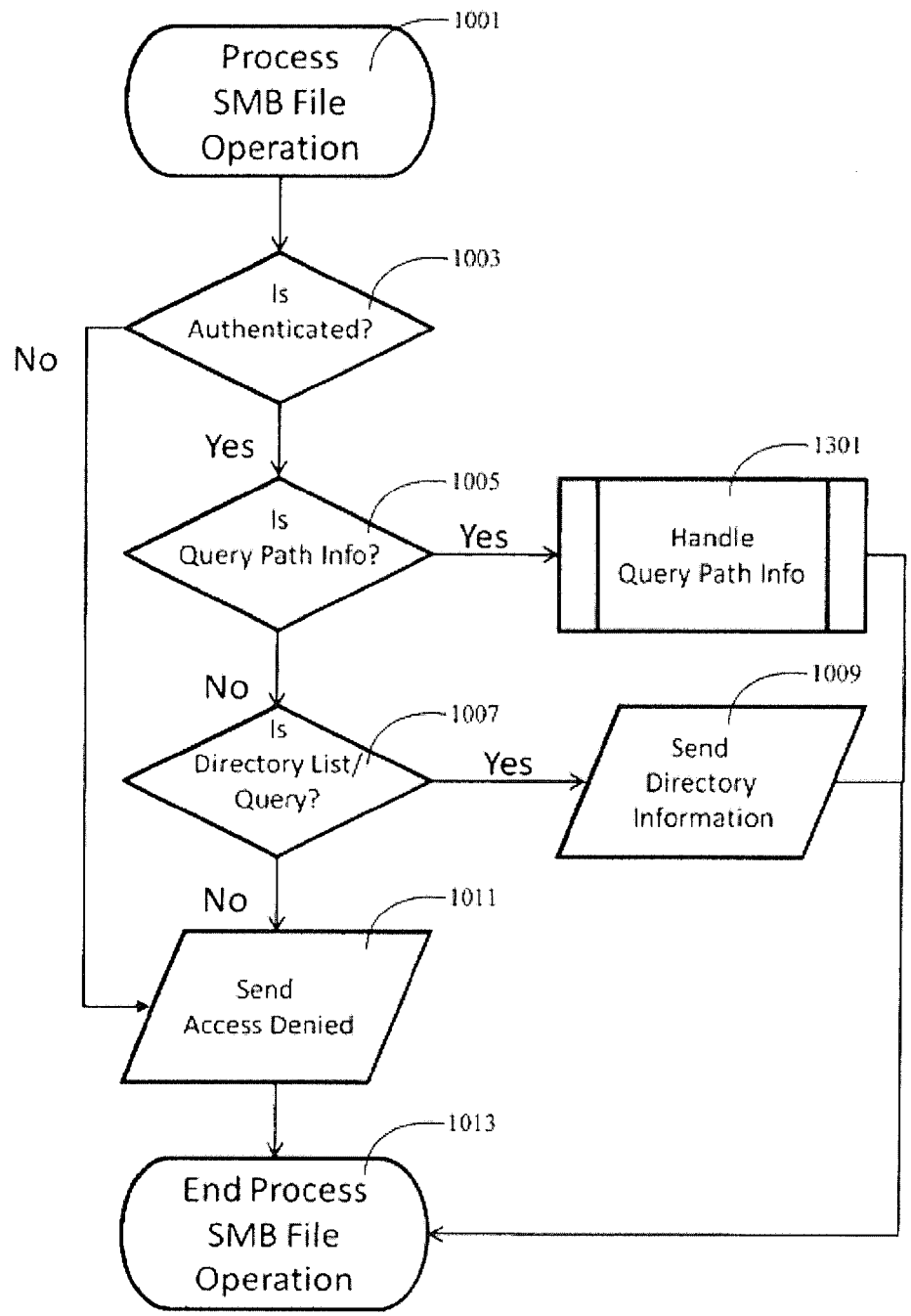
FIG. 7 is an exemplary flow diagram illustrating the steps of an embodiment of the present invention.

FIG. 7 illustrates some exemplary SMB file operation processing steps, and continues from step 1001 of FIG. 6. One will appreciate that the steps shown in FIG. 7 may be performed by GNA 151, the CIFS protocol handler module or a dedicated SMB file operation processing module. In step 1003, the SMB file operation will be checked for proper authentication. If the operation is not authenticated, then an "access denied" notification may be sent (step 1011), and the operation will end (step 1013). If the SMB file operation has been authenticated, then the operation will be analyzed to see if it is a query path info command (step 1005). If so, then in step 1301, the query path info command will be handled (see FIG. 9). After handling, the SMB file operation will conclude (step 1013). If the SMB file operation does not include a query path info, then it will be read to determine if it is a directory list/query (step 1007). If it is such a query, then the requested directory information will be returned (step 1009) and the SMB file operation will end (step 1013). If none of these file operations are requested, then access may be denied (step 1011) and the process may end (step 1013). One will appreciate that the SMB file operation may be processed beyond what is shown in FIG. 7, and the steps shown are merely exemplary.

Figure 8:
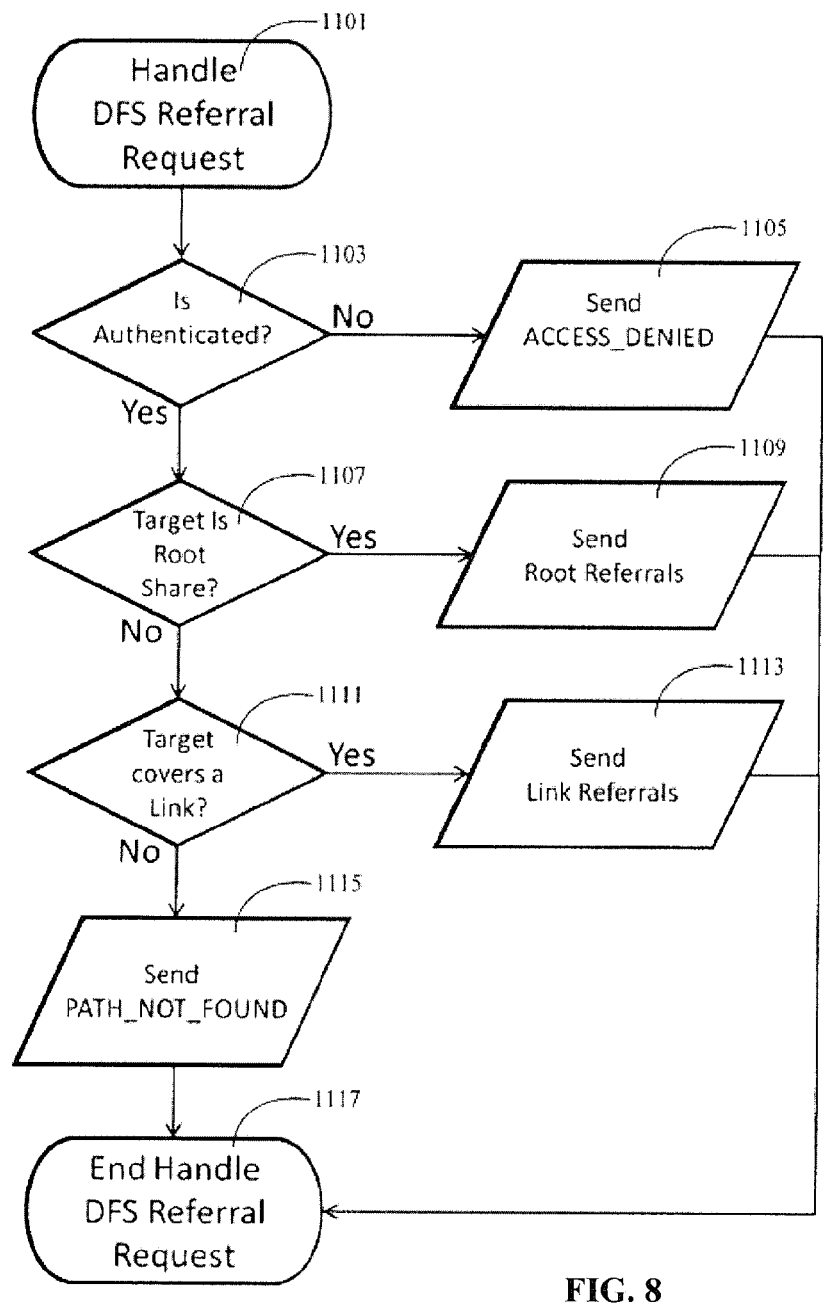
FIG. 8 is an exemplary flow diagram illustrating the steps of an embodiment of the present invention.

FIG. 8 illustrates some exemplary steps for handling the DFS referral request from FIG. 6, step 1101. One will appreciate that the steps shown in FIG. 8 may be performed by GNA 151, the CIFS protocol handler module or a dedicated DFS referral request module. In step 1103, the referral request will be checked for authentication. If it has not been authenticated, then in step 1105, an "access denied" or "ACCESS_DENIED" message will be sent, and processing will stop (step 1117). If the request has been authenticated, then the request will be read to see if its intended target is a root share (step 1107). If the DFS referral is requesting access to a root share, then in step 1109, the appropriate information will be transmitted to enable root share access and/or access may be granted (step 1109). If the DFS referral is not requesting access to a root share, then the referral may be read to determine if the target requests a link (step 1111). If the DFS referral covers a link, then the requested link information will be sent and/or access may be granted to the link (step 1113). If neither of these shares are requested, then in step 1115, the module may return a message that the requested path is not found, or "PATH_NOT_FOUND" message. After the referral is complete, the process terminates (step 1117).

Figure 9:
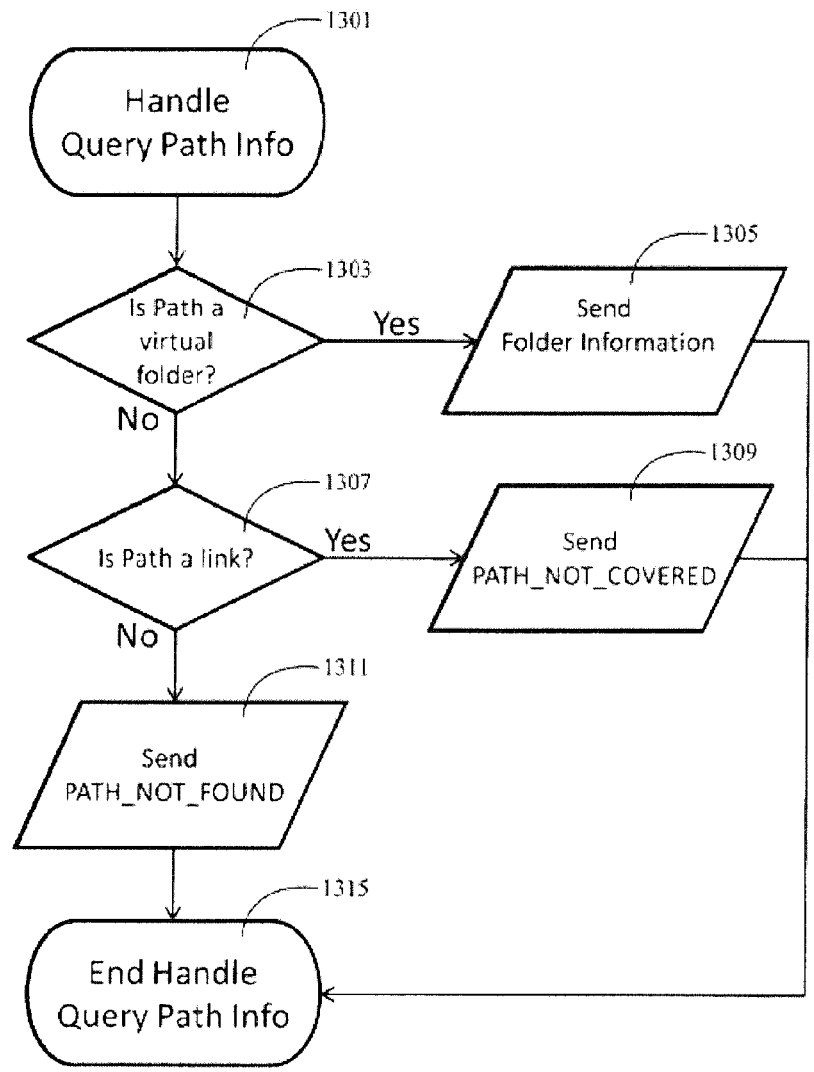
FIG. 9 is an exemplary flow diagram illustrating the steps of an embodiment of the present invention.

FIG. 9 illustrates the steps for handling a query path information request or "query path info" request. One will appreciate that the steps shown in FIG. 9 may be performed by GNA 151, the CIFS protocol handler module or a dedicated query path info module. In step 1303, the query is read to see if it requests a virtual folder. If it is a query for a virtual folder, then in step 1305, the path information of the folder will be return and/or access may be granted to the folder. If it is not a query for a virtual folder, then the query is read to see if it requests a link (step 1307). If the query does request a link, then a "PATH_NOT_COVERED" notification is returned (step 1309). If the request does not fall within either of these types, then a "PATH_NOT_FOUND" message may be returned (step 1311). After returning a notification or requested information, the process terminates in step 1313. One will appreciate that other "query path info" requests may also be supported by the present invention, and that these examples are not meant to be limiting in any fashion.

The above summarizes some of the various CIFS message processing that may be handled by GNA 151. One will appreciate that the above are a merely a sample of the present invention's CIFS message processing capabilities, and none of the above examples are meant to be limiting in any way. One or more related modules may be responsible for handling various CIFS messages, and other CIFS messages not mentioned above may also be handled by the present invention.

2. NFS Message Processing

Figure 10:
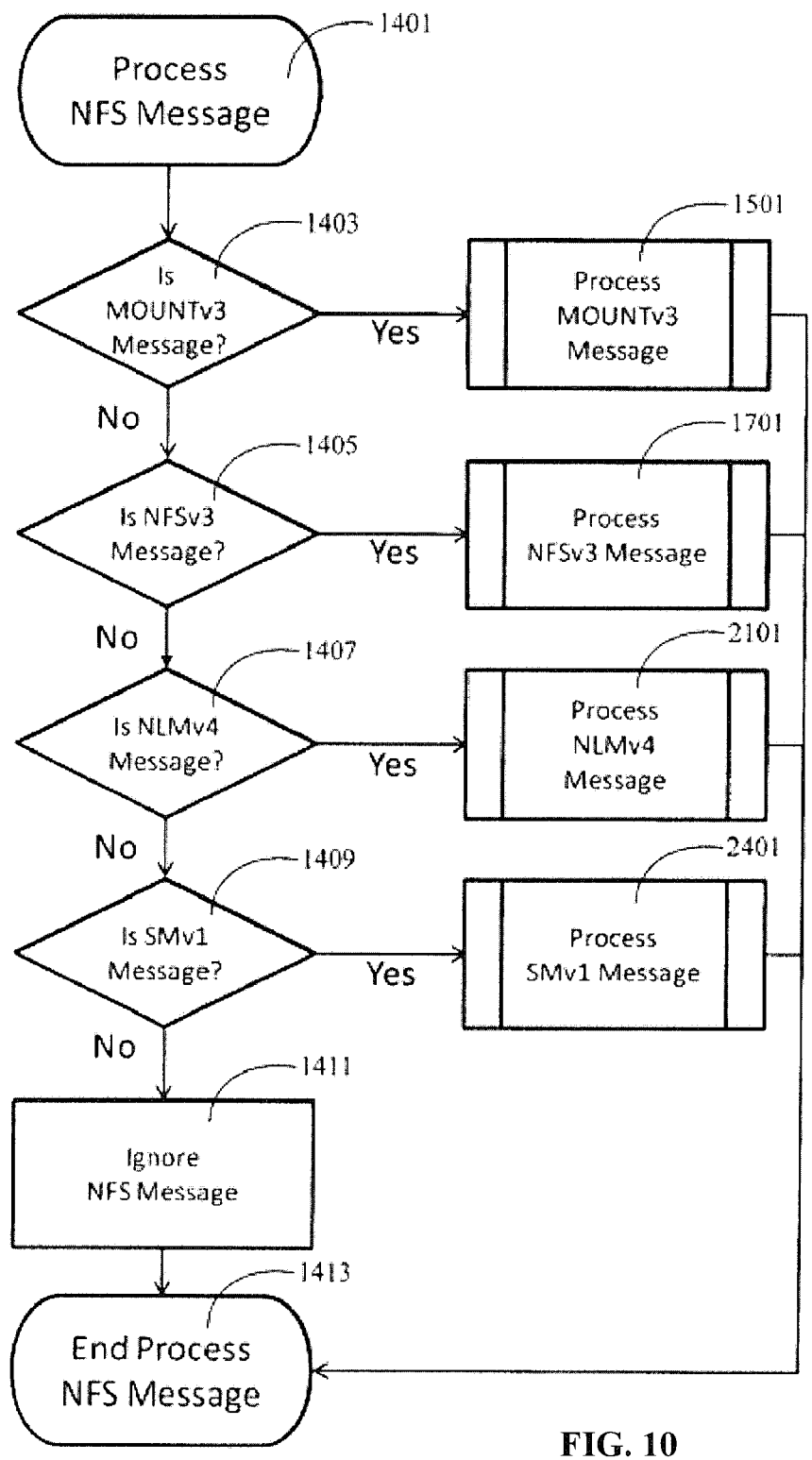
FIG. 10 is an exemplary flow diagram illustrating the steps of an embodiment of the present invention.

FIG. 10 illustrates an example of NFS message processing by a NFS protocol handler module in GNA 151. One will appreciate that there are a number of NFS messages that may be understood and processed by the present invention, and that the NFS messages shown in FIG. 10 are merely exemplary and are not meant to limit the scope of the invention.

FIG. 10 continues from FIG. 4, step 1401, in which GNA 151 has received a packet from one of the plurality of client computers 111, and has recognized that the packet uses the NFS protocol. In step 1403, the NFS packet or message will be analyzed to see if it is a MOUNTv3 message or similar mount request. If so, then the mount request will be processed (step 1501, see FIG. 11). In step 1405, the message will be analyzed to determine if it is a NFSv3 message. NFSv3 messages may be processed as well (step 1701, see FIG. 13). Similarly, the message may be read to see if it is a NLMv4 message in step 1407. If the NFS message is a NLMv4 message, it will be processed accordingly (step 2101, see FIG. 17).

Figure 11:
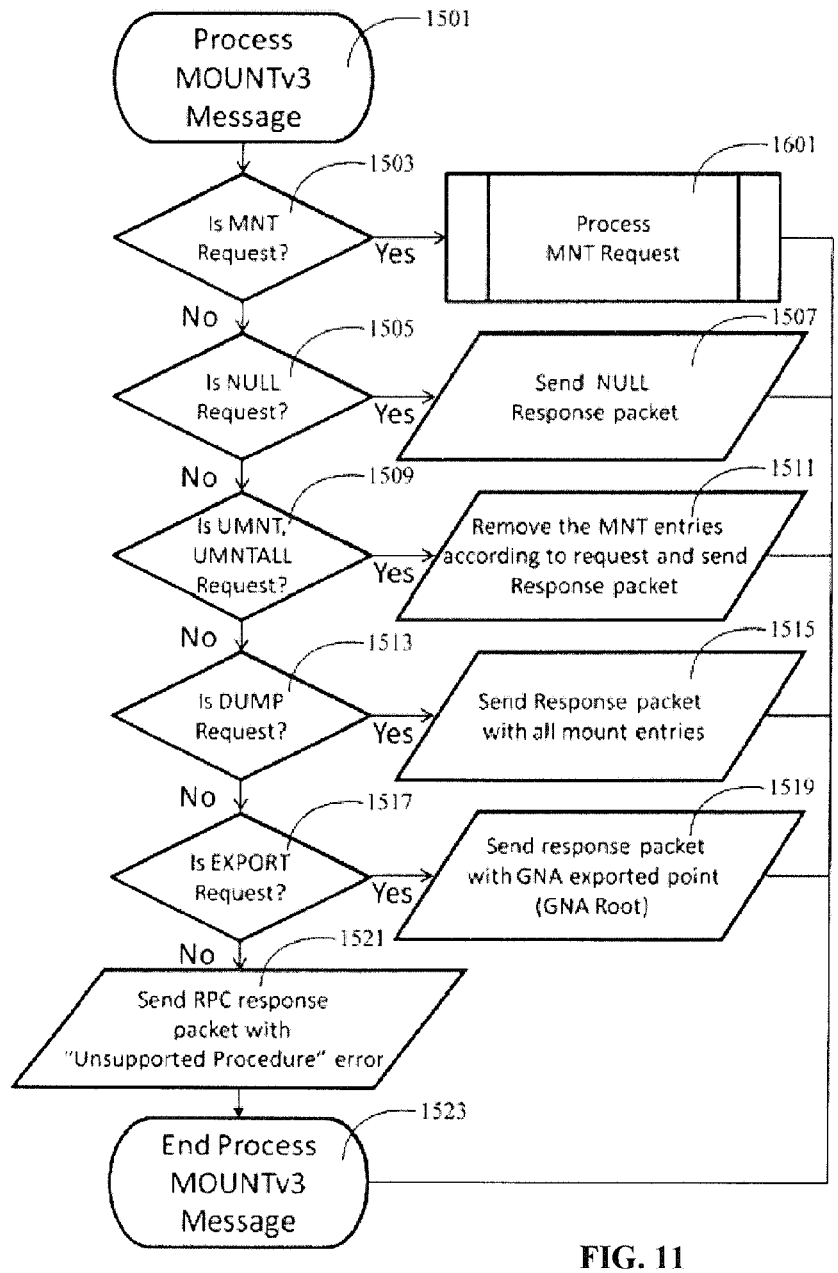
FIG. 11 is an exemplary flow diagram illustrating the steps of an embodiment of the present invention.
Figure 12:
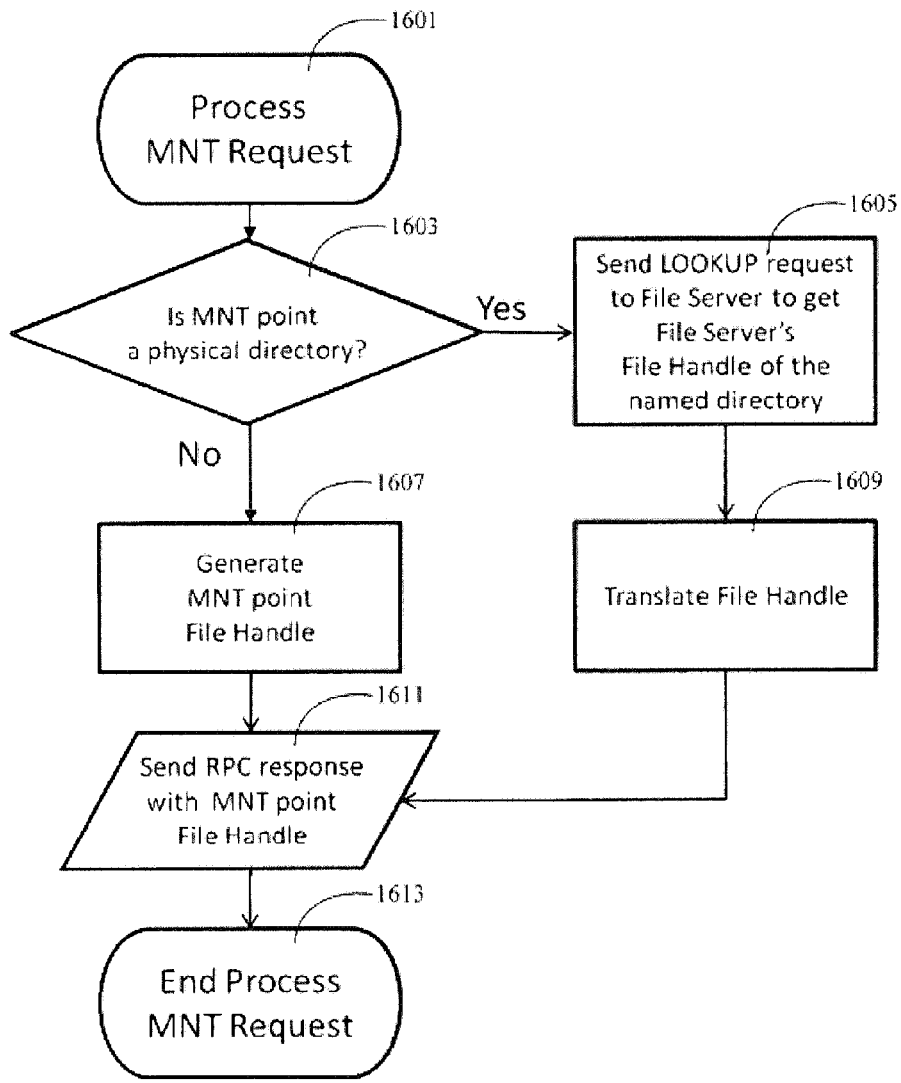
FIG. 12 is an exemplary flow diagram illustrating the steps of an embodiment of the present invention.

FIG. 11 is an exemplary flow diagram depicting how an embodiment of the present invention processes MOUNTv3 messages, and continues from step 1501 of FIG. 10. One will appreciate that the steps shown in FIG. 11 may be performed by GNA 151, the NFS protocol handler module or a dedicated MOUNTv3 processing module of the present invention.

In step 1503, the GNA 151 or other appropriate protocol handler module present invention confirms whether the MOUNTv3 message is a MNT request. If so, then the MNT request is processed in step 1601 (see FIG. 12). If the MOUNTv3 message is not a MNT request, then in step 1505, the GNA 151 or other appropriate protocol handler module checks to see if the message is a NULL request. If the message is a NULL request, then in step 1507, the GNA 151 or other appropriate protocol handler module may send the appropriate NULL response packet to the client computer. However, if the MOUNTv3 message is not a NULL request, then the GNA 151 or other appropriate protocol handler module determines whether the message is a UMNT, UMNTALL request (step 1509).

If the message is a UMNT, UMNTALL request, then in step 1511, the GNA 151 or other appropriate protocol handler module removes the MNT entries according the request and sends the appropriate response packet. If the message is not a UMNT, UMNTALL request, then in step 1513, the GNA 151 or other appropriate protocol handler module checks to see if the MOUNTv3 message is a DUMP request. If the MOUNTv3 message is a DUMP request, then in step 1515, the GNA 151 or other appropriate protocol handler module sends a response packet with all mount entries. However, if the MOUNTv3 message is not a DUMP request, then the GNA 151 or other appropriate protocol handler module will confirm whether the message is an EXPORT request (step 1517).

An EXPORT request will result in the GNA 151 or other appropriate protocol handler module sending a response packet with GNA exported point, i.e., the GNA root (step 1519). If the MOUNTv3 is not an EXPORT request, then in step 1521, the GNA 151 or other appropriate protocol handler module will send a RPC response packet with an error message, such as "unsupported procedure." After the MOUNTv3 message has been analyzed, then processing will cease in step 1523. One will appreciate that the process will also terminate after the appropriate response packet is sent. One will also appreciate that other MOUNTv3 messages may be processed by the present invention, and that these examples are not meant to be limiting in any fashion.

In step 1601 of FIG. 11, reference is made to an instance where the MOUNTv3 message is a MNT request. This is further detailed in FIG. 12. One will appreciate that the steps shown in FIG. 12 may be performed by GNA 151, the NFS protocol handler module, a dedicated MOUNTv3 processing module or a dedicated MINT request processing module. In step 1603, the GNA 151 or other appropriate protocol handler module the GNA 151 or other appropriate protocol handler module determines whether the MNT request points to a physical directory. If so, then in step 1605, a LOOKUP request or the like is sent to the appropriate file server to get the file server's file handle for the directory named by a parameter in the LOOKUP message. Then, in step 1609, the file handle is translated. In step 1611, an RPC response is sent with the translated MNT point file handle, and processing of the MNT request terminates in step 1613. If in step 1603, the MNT request does not point to a physical directory, then in step 1607, a MNT point file handle is generated. The MNT request processing then continues at step 1611 and concludes at 1613. One will appreciate that the MNT request may be processed differently without departing from this disclosure or the spirit of the present invention.

Figure 13:
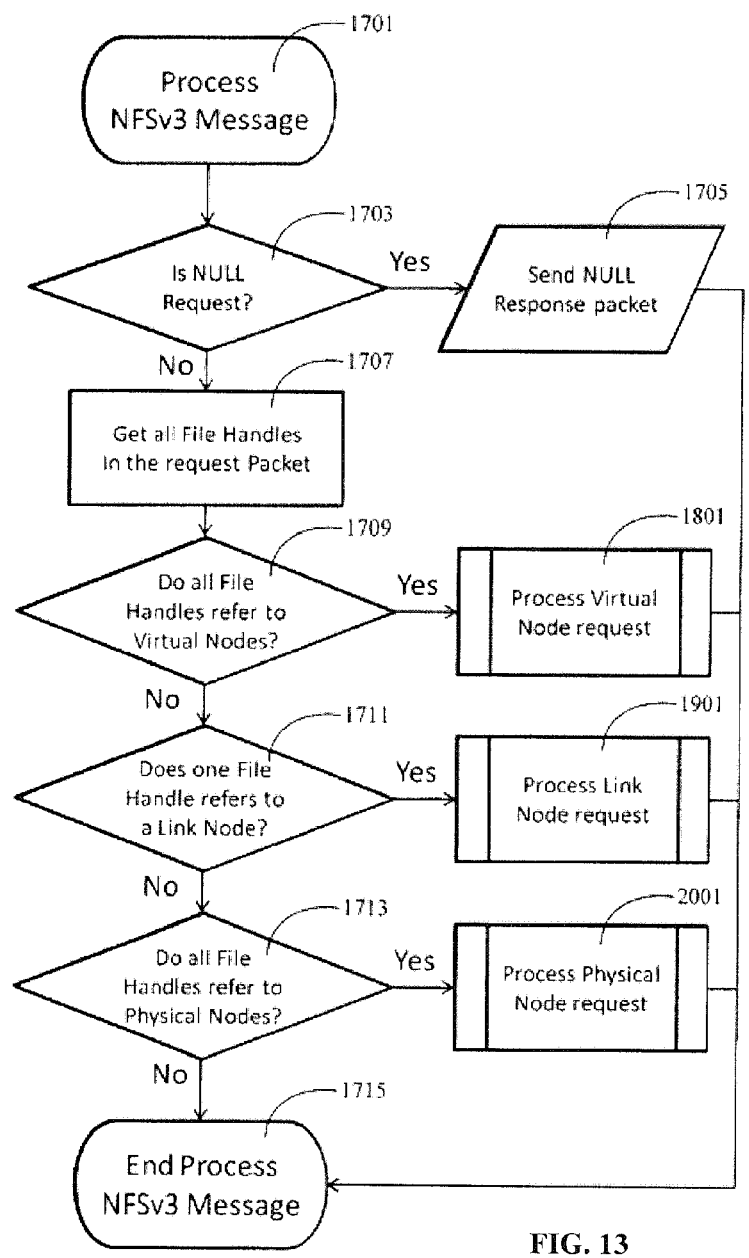
FIG. 13 is an exemplary flow diagram illustrating the steps of an embodiment of the present invention.

FIG. 13 illustrates how a message using the NFSv3 protocol may be processed. FIG. 13 continues from step 1701 of FIG. 10. One will appreciate that the steps shown in FIG. 13 may be performed by GNA 151, the NFS protocol handler module, or a dedicated NFSv3 message processing module. In step 1703, the NFSv3 message is evaluated to see if it is a NULL request. If so, then in step 1705, a NULL response packet is sent. If the NFSv3 message is not a NULL request, then all file handles in the request packet are obtained (step 1707).

In step 1709, the file handles are read to see if they all refer to virtual nodes. If so, then in step 1801, the virtual node request is processed (see FIG. 14). If the file handles do not all refer to virtual nodes, then in step 1711, the GNA 151 or other appropriate protocol handler module confirms whether one of the file handles refers to a link node. If so, then in step 1901, the link node request is processed (see FIG. 15). If none of the file handles refer to a link node, then in step 1713, the GNA 151 or other appropriate protocol handler module determines whether all file handles refer to physical nodes. If all file handles refer to physical nodes, then in step 2001, the physical node request is processed (see FIG. 16).

After the GNA 151 or other appropriate protocol handler module processes the NFSv3 message, the process ends at step 1715. One will appreciate that other NFSv3 messages may be processed by the present invention, and that these examples are not meant to be limiting in any fashion.

Figure 14:
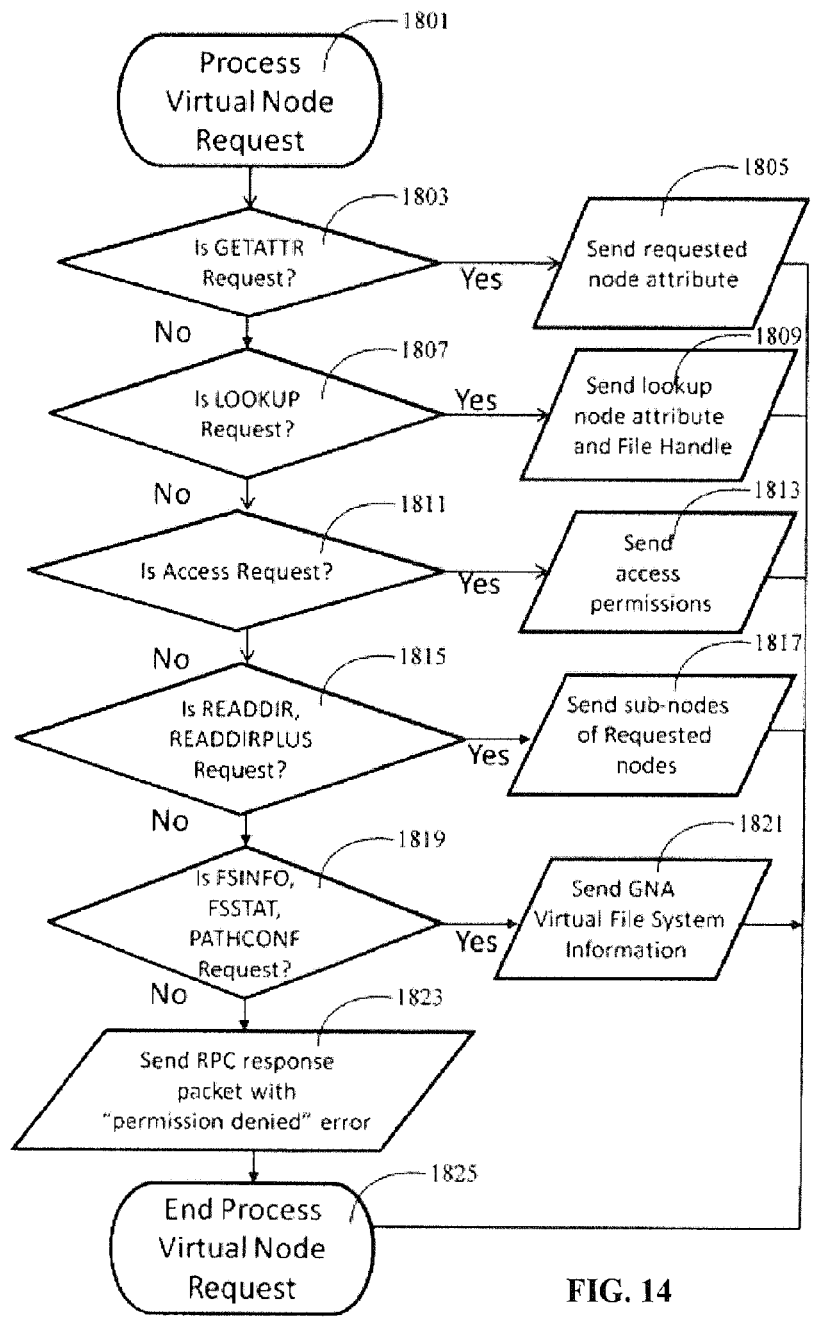
FIG. 14 is an exemplary flow diagram illustrating the steps of an embodiment of the present invention.

As mentioned in FIG. 13, the NFSv3 message may comprise a virtual node request. Virtual node requests may be processed as shown in FIG. 14, which continues from step 1801 of FIG. 13. One will appreciate that the steps shown in FIG. 14 may be performed by GNA 151, the NFS protocol handler module, the NFSv3 message processing module or a dedicated virtual node request processing module. One will appreciate that various virtual node requests may be processed by the present invention. For example, in step 1803, the virtual node request is evaluated to determine if it is a GETATTR request. If so, then in step 1805, the requested node attribute is sent. However, if the virtual node request is not a GETATTR request, then in step 1807, it is evaluated to see if it is a LOOKUP request. If the virtual node request is a LOOKUP request, then in step 1809, the appropriate lookup node attribute and file handle is sent.

In another example, the virtual node request may be an access request (step 1811), in which case the appropriate access permissions will be sent (step 1813). Alternatively, the virtual node request may be a READDIR or READDIRPLUS request (step 1815). These types of virtual node requests will result in sub-nodes of requested nodes being sent (step 1817). In step 1819, the GNA 151 or other appropriate protocol handler module checks to see if the virtual node request is a FSINFO, FSSTAT, or PATHCONF request. If so, then in step

1821, the appropriate GNA virtual file system information is sent. If none of the above-listed virtual node requests are encountered, then the GNA 151 or other appropriate protocol handler module may send an RPC response packet with a "permission denied" error message (step 1823). However, one will appreciate that other virtual node requests may be recognized and processed by the present invention, and that these examples are not meant to be limiting in any fashion. After the virtual node request is processed, the process terminates at step 1825.

Figure 15:
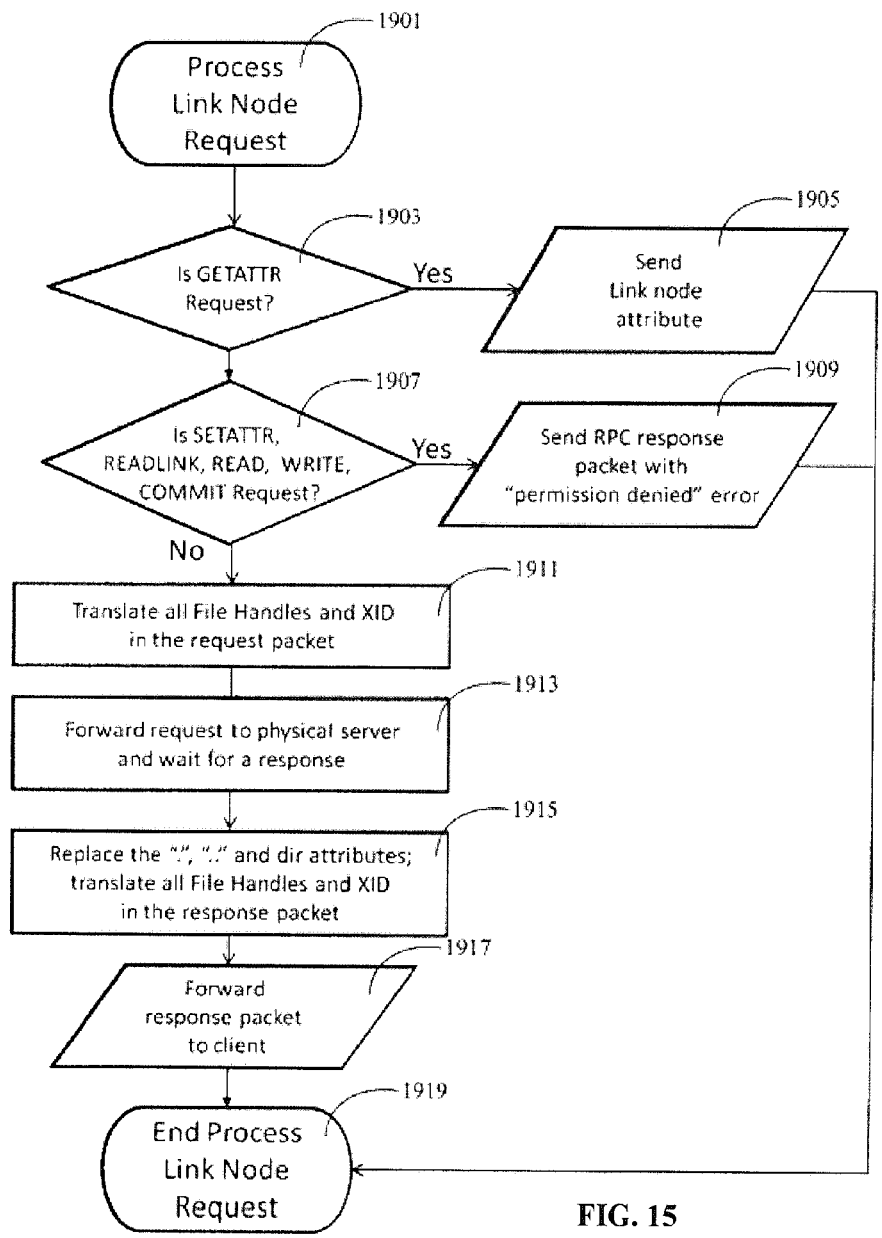
FIG. 15 is an exemplary flow diagram illustrating the steps of an embodiment of the present invention.

FIG. 15 continues step 1901 of FIG. 13 in situations where the NFSv3 message is a link node request. In other words, FIG. 15 illustrates how various link node requests are processed by an embodiment of the present invention. One will appreciate that the steps shown in FIG. 14 may be performed by GNA 151, the NFS protocol handler module, the NFSv3 message processing module or a dedicated link node request processing module.

For example, in step 1903, the NFSv3 link node request message may be a GETATTR request, in which case the appropriate link node attribute will be sent (step 1905). Alternatively, the link node request may be a SETATTR, READLINK, READ, WRITE or COMMIT request (step 1907), in which case the GNA 151 or other appropriate protocol handler module may send a RPC packet with a "permission denied" error message. If the link node request is not a GETATTR request or any of the requests previously mentioned, then in step 1911, all file handles and transaction IDs (XID) may be translated in the request packet. The link node request may then be sent to the physical server in step 1913. In step 1915, the "." and ".." directory attributes may be replaced, and all file handles and XID may be translated in the response packet. The response packet may then be sent to the client (step 1917). Link node request processing then concludes at step 1919. One will appreciate that other link node requests may be recognized and processed by the present invention, and that these examples are not meant to be limiting in any fashion.

Figure 16:
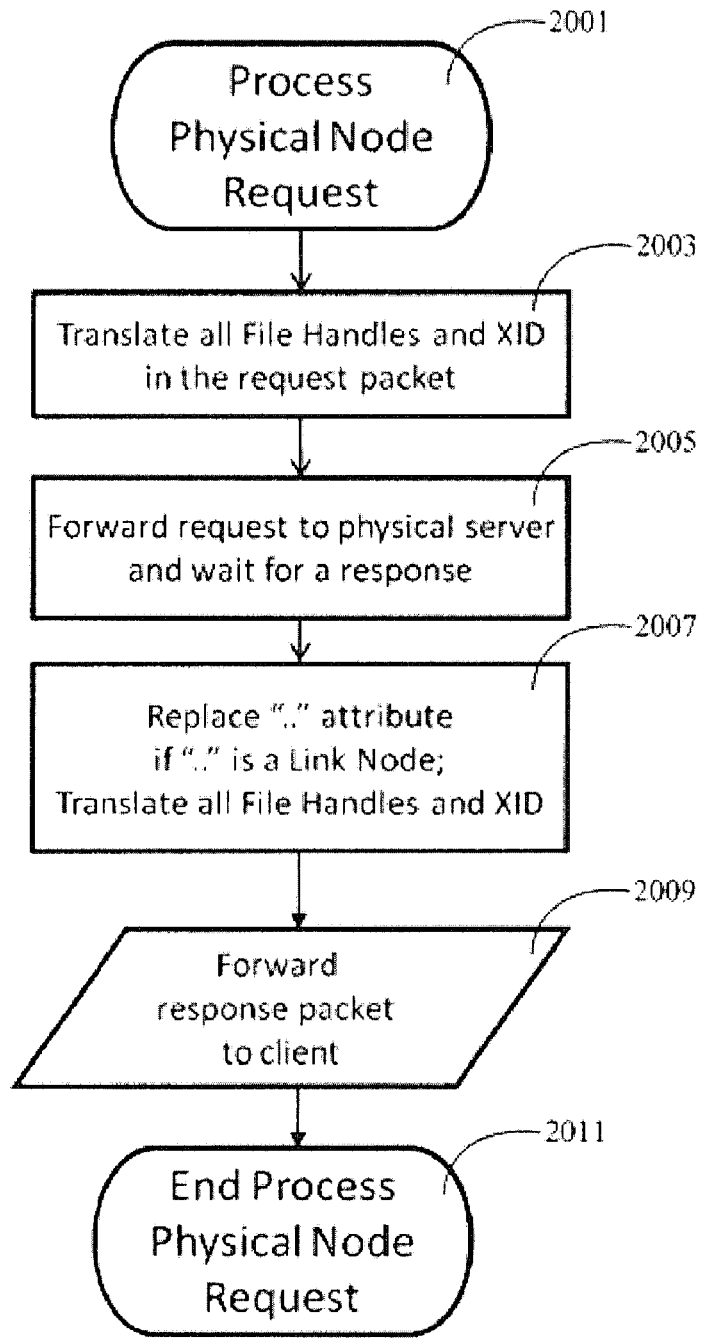
FIG. 16 is an exemplary flow diagram illustrating the steps of an embodiment of the present invention.

In an embodiment, the NFSv3 message may be a physical node request, as shown in step 2001 of FIG. 13. FIG. 16 illustrates how a NFSv3 physical node request may be processed by an embodiment of the present invention. One will appreciate that the steps shown in FIG. 16 may be performed by GNA 151, the NFS protocol handler module, the NFSv3 message processing module or a dedicated physical node request processing module. In step 2003, all file handles and XID in the physical node request packet may be translated, and in step 2005, forwarded to the physical server for response. In step 2007, the "." attribute may be replaced if ".." is a link node. Then, all file handles and XID may be translated, and in step 2009, the response from the physical server may be sent to the client. Processing of the physical node request then concludes in step 2011. One will appreciate that the steps of FIG. 16 are merely exemplary, and may vary without departing from the scope of this disclosure or the spirit of the present invention.

Figure 17:
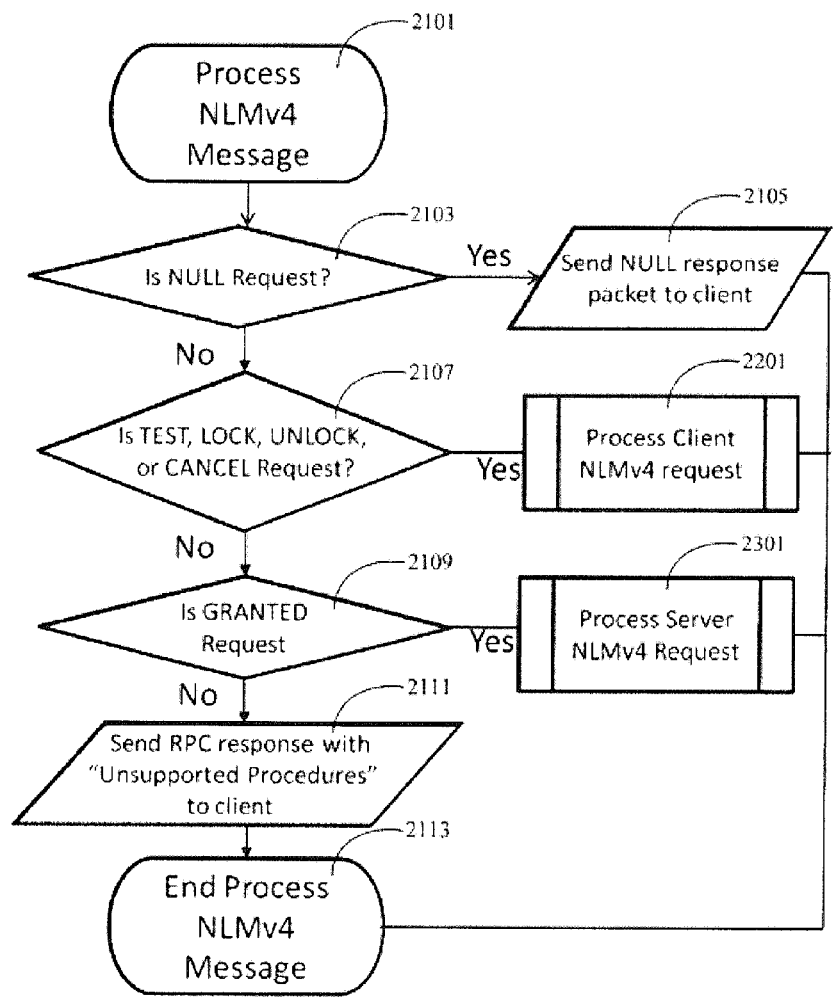
FIG. 17 is an exemplary flow diagram illustrating the steps of an embodiment of the present invention.

FIG. 17 illustrates how NFS NLMv4 messages are processed, and continues from step 2101 of FIG. 10. One will appreciate that the steps shown in FIG. 17 may be performed by GNA 151, the NFS protocol handler module or a dedicated NLMv4 message processing module. Initially, the NLMv4 message may be read to determine if it is a NULL request (step 2103). If so, then a NULL response packet may be sent to the client (step 2105). If the NLMv4 message is not a NULL response packet, then it may evaluated to see if it is a TEST, LOCK, UNLOCK or CANCEL request, i.e. client requests (step 2107). Client NLMv4 requests are discussed in more detail in FIG. 18 (step 2201). If the NLMv4 message is a GRANTED request (step 2109), then it is processed as a server NLMv4 request (step 2301, see FIG. 19). If the NLMv4 message is not any of these requests, then the GNA 151 or other appropriate protocol handler module may send a RPC response with an "unsupported procedures" message to the client. However, one will appreciate that other NLMv4 messages may be recognized and processed by the present invention, and that these examples are not meant to be limiting in any fashion. NLMv4 message processing concludes at step 2113.

Figure 18:
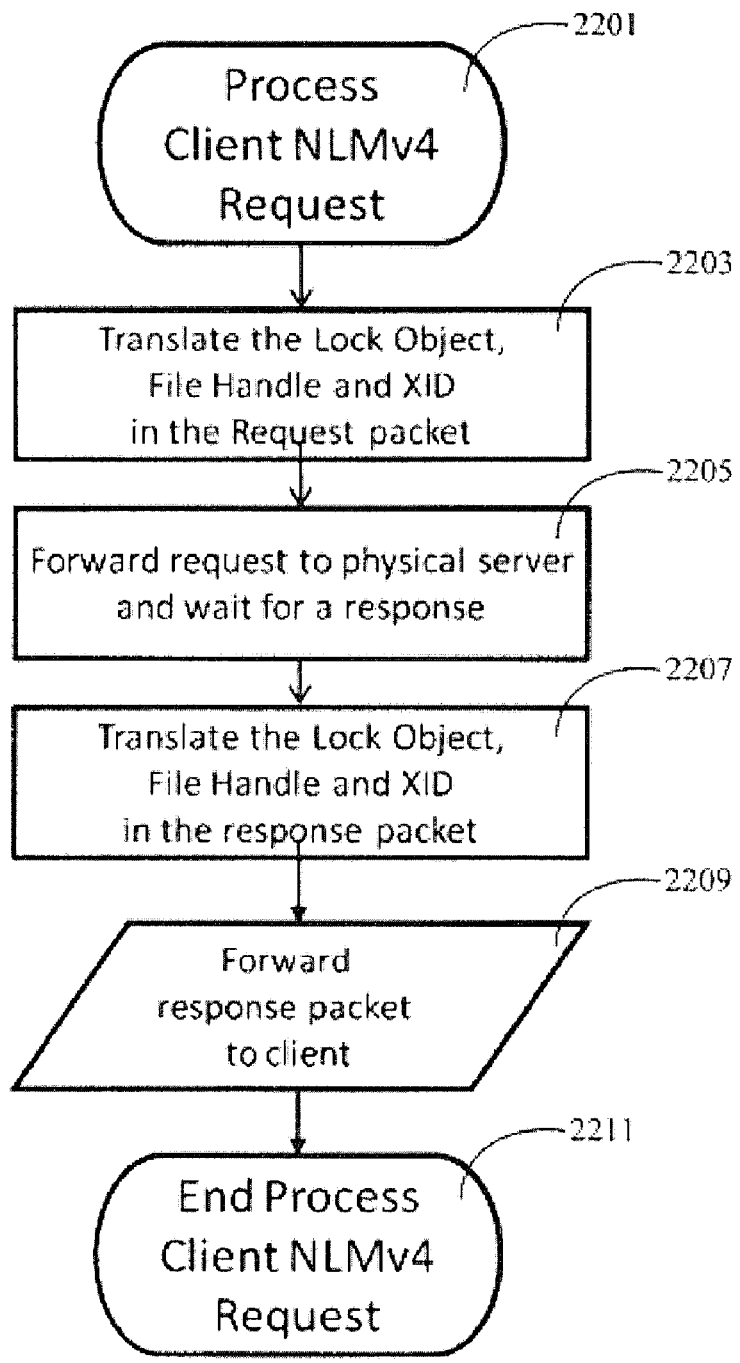
FIG. 18 is an exemplary flow diagram illustrating the steps of an embodiment of the present invention.

As previously mentioned in FIG. 17, the NLMv4 message may be a client NLMv4 request (step 2201). FIG. 18 continues from step 2201, and illustrates how a client NLMv4 request may be processed by an embodiment of the present invention. One will appreciate that the steps shown in FIG. 18 may be performed by GNA 151, the NFS protocol handler module, a dedicated NLMv4 message processing module or a dedicated client NLMv4 request processing module. In step 2203, the lock object, file handle and XID in the NLMv4 request packet may be translated, and in step 2205, sent to the physical server for response. Once the response is received, in step 2207, the lock object, file handle and XID in the response packet may be translated. The translated response packet is then sent to the client in step 2209, and the process concludes at step 2211. One will appreciate that the steps of FIG. 18 are merely exemplary, and may vary without departing from the scope of this disclosure or the spirit of the present invention.

Figure 19:
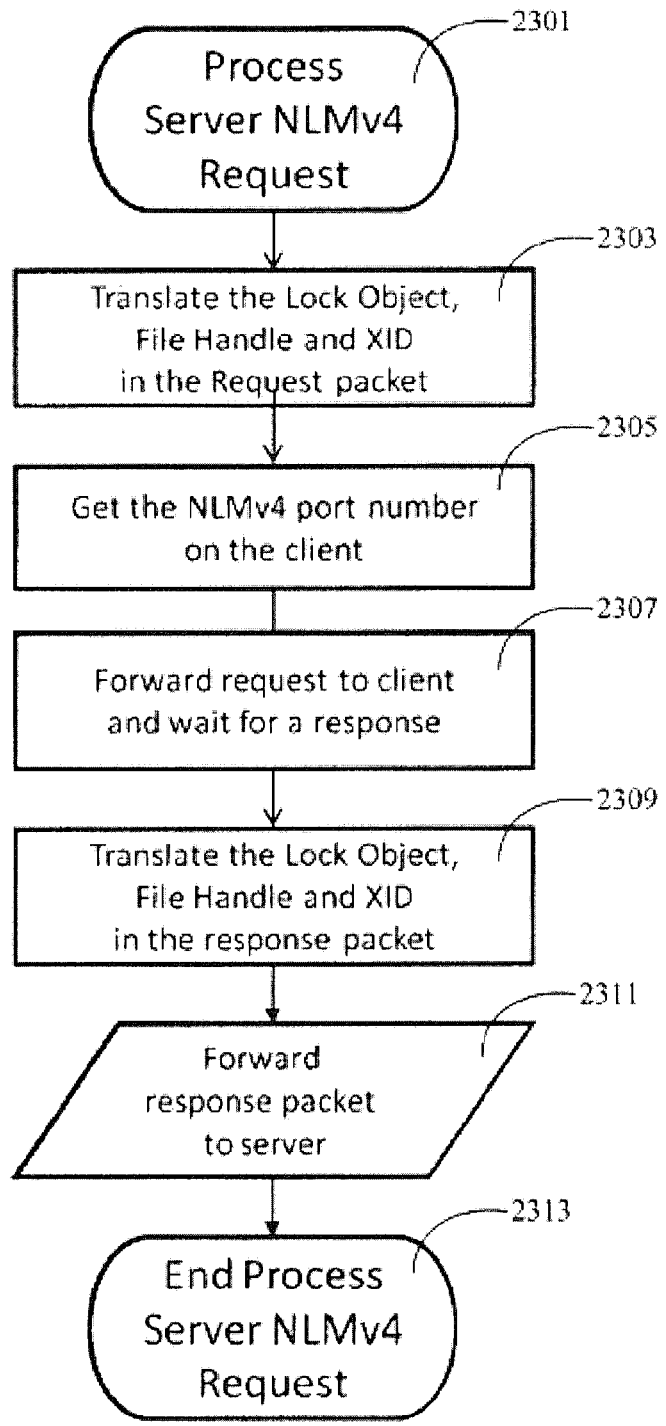
FIG. 19 is an exemplary flow diagram illustrating the steps of an embodiment of the present invention.

Similarly, as previous mentioned in FIG. 17, the NLMv4 message may be a server NLMv4 request (step 2301). FIG. 19 continues from step 2301, and illustrates how a server NLMv4 request may be processed by an embodiment of the present invention. One will appreciate that the steps shown in FIG. 19 may be performed by GNA 151, the NFS protocol handler module, a dedicated NLMv4 message processing module or a dedicated server NLMv4 request processing module. In step 2303, the lock object, file handle and XID in the server NLMv4 request packet may be translated. In step 2305, the GNA 151 or other appropriate protocol handler module obtains the NLMv4 port number on the client computer. Then, in step 2307, the server requests may be sent to the client for response. Once the response is received, in step 2309, the lock object, file handle and XID in the response packet may be translated. The translated response packet is then sent to the server in step 2311, and the process concludes at step 2313. One will appreciate that the steps of FIG. 19 are merely exemplary, and may vary without departing from the scope of this disclosure or the spirit of the present invention.

Figure 20:
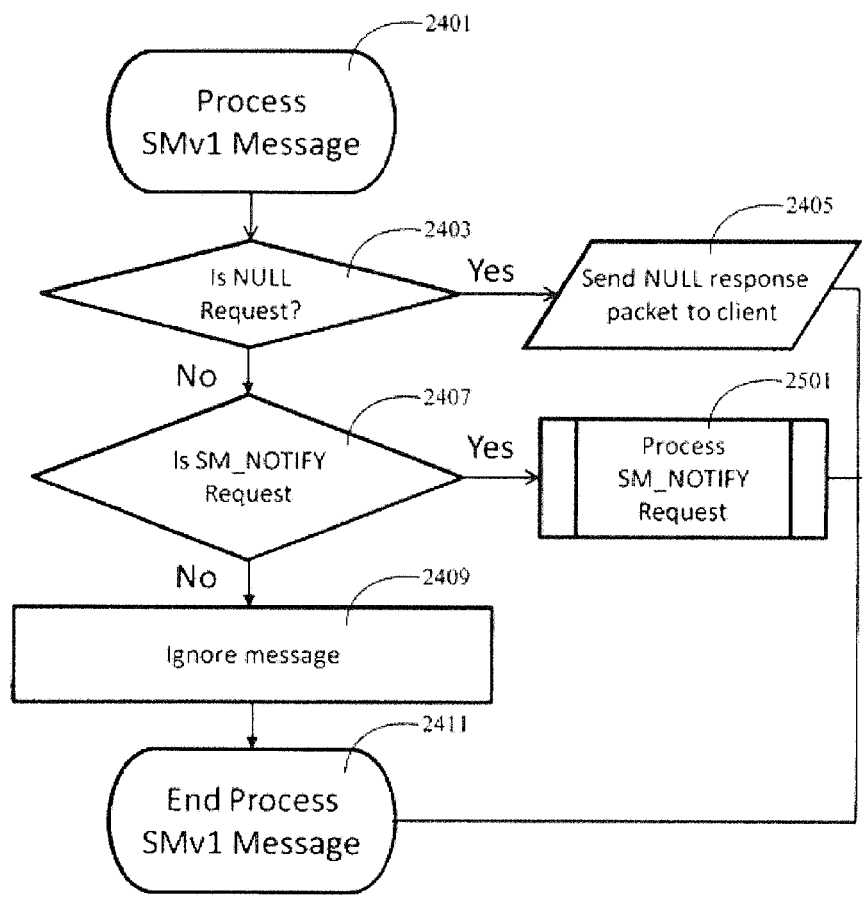
FIG. 20 is an exemplary flow diagram illustrating the steps of an embodiment of the present invention.
Figure 21:
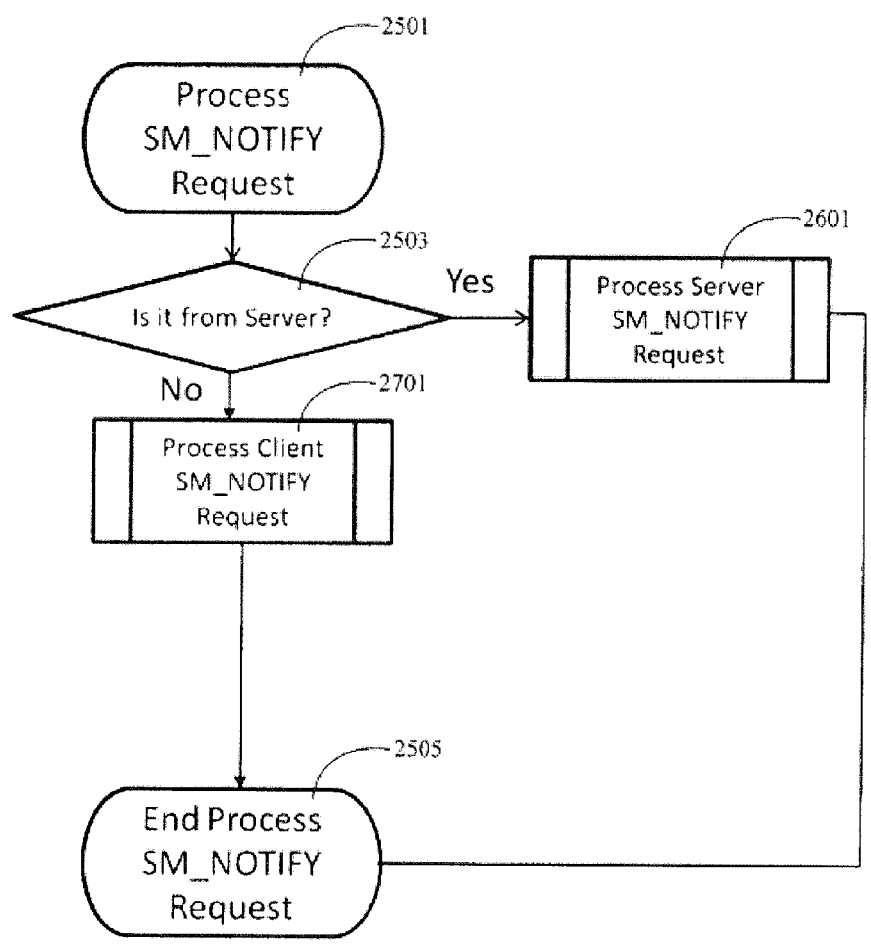
FIG. 21 is an exemplary flow diagram illustrating the steps of an embodiment of the present invention.

FIG. 20 illustrates how a SMv1 NFS message may be processed. FIG. 20 continues from step 2401 of FIG. 10. One will appreciate that the steps shown in FIG. 20 may be performed by GNA 151, the NFS protocol handler module or a dedicated SMv1 message processing module. In step 2403, the GNA 151 or other appropriate protocol handler module checks to see if the SMv1 message is a NULL request. If so, then in step 2405, a NULL response packet is sent to the client. If not, then the GNA 151 or other appropriate protocol handler module may determine whether the SMv1 message is a SM_NOTIFY request (step 2501). One will appreciate that the SM_NOTIFY request is a type of RPC that requests specific types of information from a host or file server. SM_NOTIFY requests may be processed as illustrated in FIG. 21. If the SMv1 message is neither a NULL request nor a SM_NOTIFY message, then the GNA 151 or other appropriate protocol handler module may ignore the purported SMv1 message (step 2409), and message processing concludes in step 2411. One will appreciate that other SMv1 messages may be recognized and processed by the present invention, and that these examples are not meant to be limiting in any fashion.

As previously mentioned, SM_NOTIFY requests may be processed separately from other SMv1 messages. This is depicted in FIG. 21, which continues from step 2501 of FIG. 20. One will appreciate that the steps shown in FIG. 21 may be performed by GNA 151, the NFS protocol handler module, a SMv1 message processing module or a dedicated SM_NOTIFY request processing module. In step 2503, the GNA 151 or other appropriate protocol handler module will detect whether the SM_NOTIFY request originates from the server. If so, then in step 2601, the server SM_NOTIFY request will be processed (see FIG. 22). If not, then in step 2701 the SM_NOTIFY request will be processed as a client request (see FIG. 23). Once the GNA 151 or other appropriate protocol handler module determines whether to process the SM_NOTIFY request as a server or client request, the process concludes at step 2505. One will appreciate that other types of SM_NOTIFY requests may be recognized and processed by the present invention, and that these examples are not meant to be limiting in any fashion.

Figure 22:
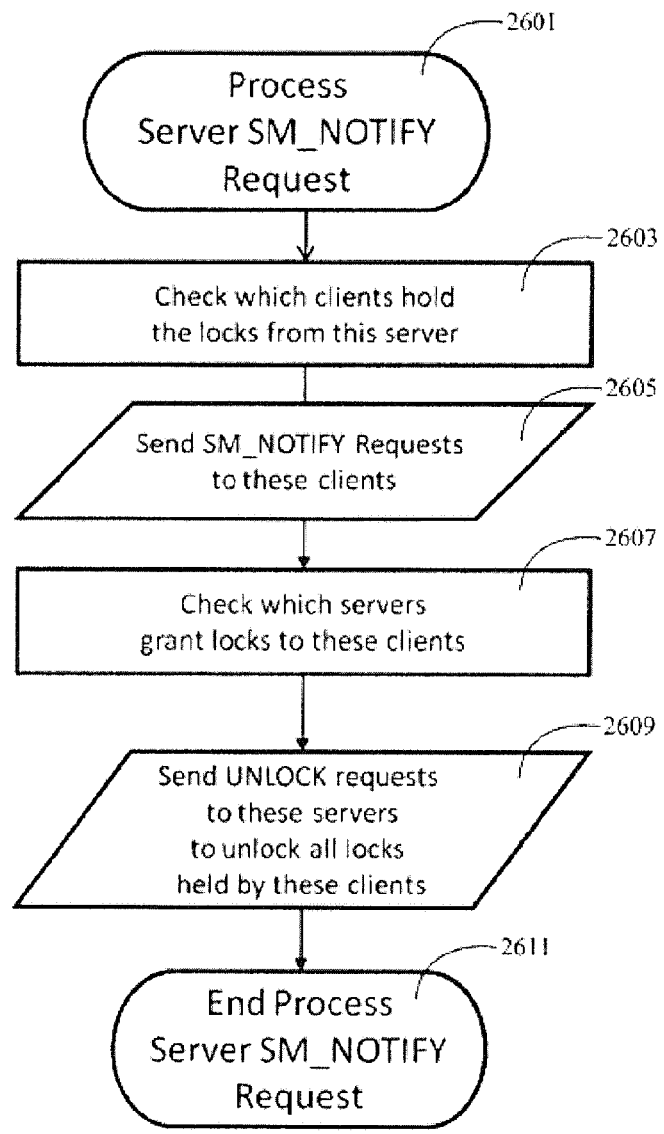
FIG. 22 is an exemplary flow diagram illustrating the steps of an embodiment of the present invention.

Step 2601 of FIG. 21 continues in FIG. 22, which illustrates how server SM_NOTIFY requests may be processed by an embodiment of the present invention. One will appreciate that the steps shown in FIG. 22 may be performed by GNA 151, the NFS protocol handler module, a SMv1 message processing module, a SM_NOTIFY request processing module or a dedicated server SM_NOTIFY request processing module. In step 2603, the GNA 151 or other appropriate protocol handler module determines which clients hold locks from the server. Once these clients are known, in step 2605, the SM_NOTIFY requests are sent. In step 2607, the GNA 151 or other appropriate protocol handler module checks which servers grant locks to these clients. Once these servers are known, UNLOCK requests are sent to these servers to unlock all locks held by the clients (step 2609). The process concludes at step 2611. One will appreciate that other steps may be performed in processing a server SM_NOTIFY request, and that these are merely exemplary and not intended to limit the present invention in any way.

Figure 23:
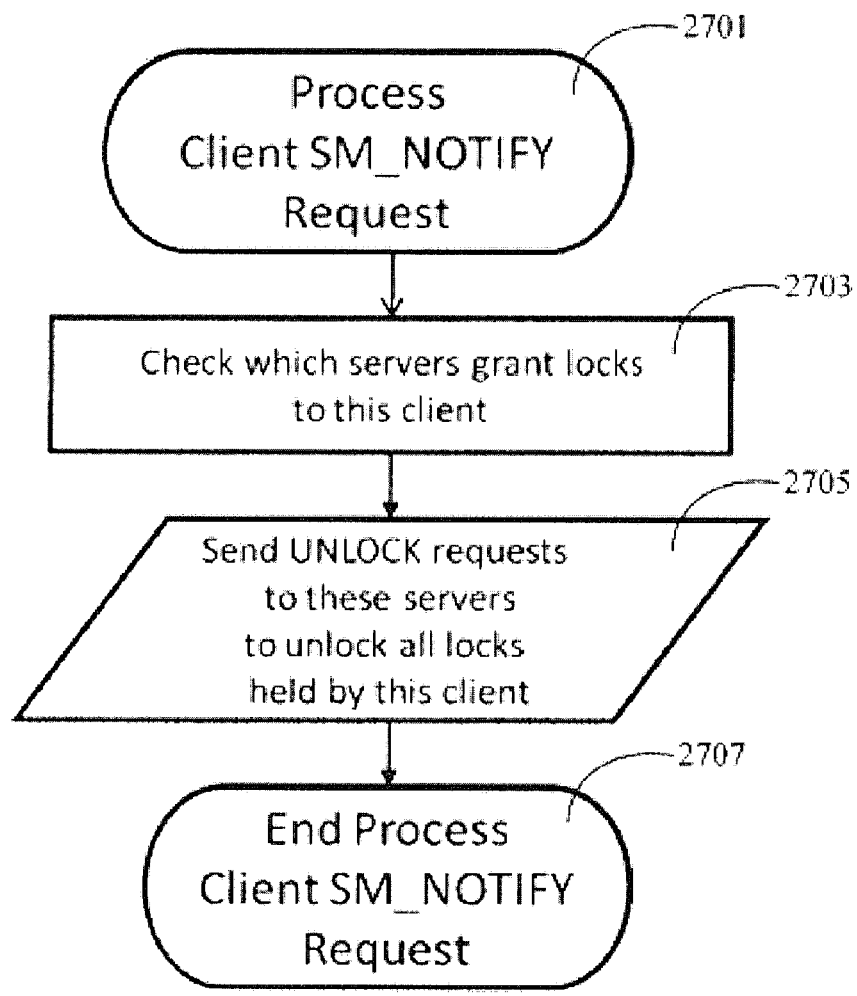
FIG. 23 is an exemplary flow diagram illustrating the steps of an embodiment of the present invention.

Step 2701 of FIG. 21 continues in FIG. 23, which illustrates how client SM_NOTIFY requests may be processed by an embodiment of the present invention. One will appreciate that the steps shown in FIG. 23 may be performed by GNA 151, the NFS protocol handler module, a SMv1 message processing module, a SM_NOTIFY request processing module or a dedicated client SM_NOTIFY request processing module. In step 2703, the GNA 151 or other appropriate protocol handler module determines which servers grant locks to the client. Once these servers are known, UNLOCK requests are sent to the servers to unlock all locks held by the client (step 2705). The process concludes at step 2707. One will appreciate that other steps may be performed in processing a client SM_NOTIFY request, and that these are merely exemplary and not intended to limit the present invention in any way.

A person having skill in the art will appreciate that in the NFS protocol, a File Handle is used to identify each specific file object on a file server. For client computers 111 accessing file servers 121 using the present invention, the File Handle may be either generated or translated by the GNA 151. When a client requests access to the file object identified by a File Handle, the GNA 151 should know on which file server the file object identified by this File Handle is stored. In a File Handle generated by a physical file server, there may be no information that the GNA 151 can use to determine the location of the file object identified by this File Handle. In this instance, GNA 151 may encode some information in the File Handle before it sends the File Handle to a client. The file handle translation feature of GNA 151 comprises appending some information or metadata in the File Handle, i.e., the file server IP address. This is feasible because the NFSv3 File Handle format allows 64 bytes per handle, and almost all NFS file servers use less than 44 bytes. This embodiment changes the File Handle size and packet size and thereby decreases the performance of GNA 151.

Alternatively, an embodiment of the present invention may replace some data in the File Handle with GNA-provided information. In any File Handle almost all file servers encode some constant data for each share or export. This constant information may include a File System ID and a mount point ID. Various file servers may encode the constant data in various locations within their File Handle formats. To use this embodiment of the invention, the GNA 151 must know the accurate location of the constant data within the File Handle. The present invention is able translate between a File Handle from a physical server physical (PFH) and the File Handle with encoded GNA information, i.e., a virtual File Handle (VFH). A File Handle Translator module may translate between the VFH/PFH and PFH/VFH using one of the embodiments mentioned herein.

Clients may also access objects existing within the GNA 151 itself (e.g. a virtual directory or a link) in addition to physical files and directories. An NFSv3 Server module in an embodiment of the present invention may contain a read-only NFSv3 file server to support GNA node (virtual directory or node) access. According to the NFS protocol, this NFSv3 Server should generate a unique File Handle for each GNA node, which can be called a GNA File Handle (GFH). One skilled in the art will appreciate that other variations are also possible.

The above summarizes some of the various NFS message processing that may be handled by GNA 151. One will appreciate that the above are a merely a sample of the present invention's NFS message processing capabilities, and none of the above examples are meant to be limiting in any way. One or more related modules may be responsible for handling various NFS messages, and other NFS messages not mentioned above may also be handled by the present invention.

3. FMP Message Processing

Figure 24:
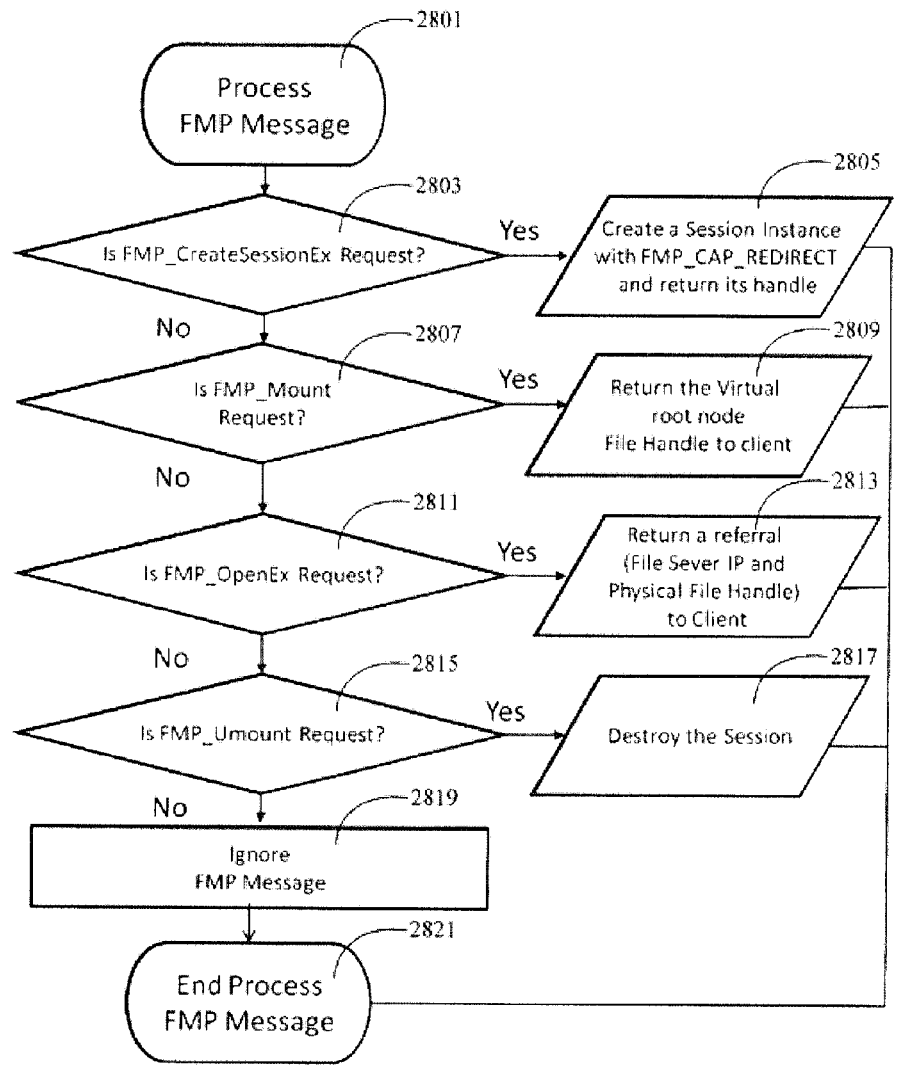
FIG. 24 is an exemplary flow diagram illustrating the steps of an embodiment of the present invention.

FIG. 24 illustrates an example of FMP message processing by a FMP protocol handler module in GNA 151. One will appreciate that the steps shown in FIG. 24 may be performed by GNA 151 or a dedicated FMP message processing module. In step 2803, the FMP message is evaluated to determine if it is a FMP_CreateSessionEx Request. If so, then a session instance is created with FMP_CAP_REDIRECT (step 2805). If not, then the FMP message may be checked to evaluate whether it is a FMP_Mount request (step 2807). These messages result in sending the virtual root node file handle back to the client in step 2809. The FMP message may be a FMP_OpenEx request (step 2811), in which case a referral, i.e. file server IP address and physical file handle, may be sent to the client. Alternatively, the FMP message may be a FMP_Umount request (step 2819). If so, then in step 2817, the session is destroyed. One will appreciate that other FMP messages may be understood and processed by the present invention, and that these examples are not meant to be limiting in any way. Once the FMP message is processed, the method concludes at step 2821.

The above summarizes one type of FMP message processing that may be handled by GNA 151. One will appreciate that the above is a merely a sample of the present invention's FMP message processing capabilities, and none of the above examples are meant to be limiting in any way. One or more related modules may be responsible for handling various FMP messages, and other FMP messages not mentioned above may also be handled by the present invention.

As described above, GNA 151 is able to receive and process data packets between client computers 111 and file servers 121 regardless of protocol. Each packet may be handled by a respective protocol handler module or a combination of modules directing the packet to the appropriate destination. The process will repeat for each received packet, or after each respective protocol handler module completes processing (see FIG. 4 following steps 501, 1401, 2801 and 411). Because all packets may be handled by GNA 151, client computers 111 need only be connected to GNA 151 in order to gain access to file server 131 for non-referral based NAS protocols. In order to provide a visual representation of this configuration, GNA 151 graphically abstracts access to all file servers 131 as a single namespace for both referral-based and non-referral-based NAS protocols. In this fashion, the present invention improves client-file server connections.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the present invention. One will appreciate that these steps are merely exemplary and are not meant to be limiting in any way. Other steps and functions may be contemplated without departing from this disclosure or the scope of the present invention.

What is claimed is:

1. A system for providing access to a plurality of file servers on a network comprising:
at least one namespace computer accessible by any one of a plurality of client computers on the network, each of the plurality of client computers using one or more network protocols, the namespace computer having access to the plurality of file server shares, and each of the plurality of file servers uses one or more network protocols;
wherein the at least one namespace computer includes a protocol handling unit having a plurality of protocol processing modules, each protocol processing module configured for handling a different network protocol in order to provide access from each of the plurality of client computers to each of the plurality of file server shares using a single mount point;
wherein the namespace computer provides a graphic user interface having a single namespace to each of the plurality of client computers, wherein the graphic user interface displays information for each of the plurality of file servers on the network.

2. The system of claim 1, wherein the one or more network protocols is selected from the group consisting of NFS, CIFS and FMP.

3. A method for providing access to a plurality of file servers on a network comprising:
receiving from one of a plurality of client computers by a system for providing access to the plurality of file servers using a single mount point and a namespace computer, a request for access to at least one of the plurality of file servers, wherein the request for access is in the form of a defined network protocol;
processing the request for access using a protocol handling unit of the system, the protocol handling unit having a plurality of protocol processing modules, each protocol processing module configured for handling one of a plurality of different network protocols, including one configured for handling the defined network protocol;
providing mapping information as processed by the protocol handling unit to the requesting client computer; and
accessing, by the client computer, the requested file server;
wherein the namespace computer provides a graphic user interface having a single namespace to each of the plurality of client computers, wherein the graphic user interface displays information for each of the plurality of file servers on the network.

4. The method of claim 3, wherein the network protocol is selected from the group consisting of NFS, CIFS and FMP.

5. A method for providing access to a plurality of file servers on a network comprising:
receiving from one of a plurality of client computers by a system for providing access to the plurality of file servers using a single mount point and a namespace computer, a request for access to one of the plurality of file servers, wherein the request for access is in the form of a defined network protocol;
locating mapping information for the requested file server by using a protocol handling unit of the system to process the request for access, the protocol handling unit having a plurality of protocol processing modules, each protocol processing module configured for handling one of a plurality of different network protocols, including one configured for handling the defined network protocol;
accessing, by the system, the requested file server as a proxy for the requesting client computer;
wherein the namespace computer provides a graphic user interface having a single namespace to each of the plurality of client computers, wherein the graphic user interface displays information for each of the plurality of file servers on the network.

6. The method of claim 5, wherein the network protocol is selected from the group consisting of NFS, CIFS and FMP.

7. A method for providing access to a plurality of file servers on a network comprising:
receiving from one of a plurality of client computers by a system for providing access to the plurality of file servers using a single mount point and a namespace computer, a request for access to one of the plurality of file servers, wherein the request for access is in the form of a CIFS or NFSv4 protocol;
locating referral information for the file server by using a protocol handling unit of the system to process the request for access, the protocol handling unit having at least two protocol processing units, one configured for handling CIFS protocol and one configured for handling NFSv4 protocol;
providing referral information to the requesting client computer; and accessing, by the client computer, the requested file server using the referral information;
wherein the namespace computer provides a graphic user interface having a single namespace to each of the plurality of client computers, wherein the graphic user interface displays information for each of the plurality of file servers on the network.

8. A computer program product, comprising a non-transitory computer usable medium having a computer readable program code embodied therein, said computer readable program code adapted to be executed to implement a method for providing access to a plurality of file servers on a network, said method comprising:

receiving from one of a plurality of client computers, a request for access to at least one of the plurality of file servers, wherein the request for access is in the form of a defined network protocol and received by the system for providing access to the plurality of file servers using a single mount point and a namespace computer;

processing the request for access using a protocol handling routine having a plurality of protocol processing modules, each protocol processing module configured for handling one of a plurality of different network protocols, including one configured for handling the defined network protocol;

providing mapping information as processed by the protocol handling unit to the requesting client computer; and accessing, by the client computer, the requested file server;

wherein the namespace computer provides a graphic user interface having a single namespace to each of the plurality of client computers, wherein the graphic user interface displays information for each of the plurality of file servers on the network.

9. The computer program product of claim 8, wherein the network protocol is selected from the group consisting of NFS, CIFS and FMP.

10. A method for providing access to a plurality of file servers on a network comprising:

displaying, by a namespace computer, a graphic user interface having a single namespace to each of a plurality of client computers, the namespace displaying information for the plurality of file servers on the network;

receiving a request, from one of a plurality of client computers on the network, to access at least one of the plurality of file servers wherein the request is in the form of a defined network protocol; and processing the request using a protocol handling unit of a namespace computer, the protocol handling unit having a plurality of protocol processing modules, each protocol processing module configured for handling one of a plurality of different network protocols, including one configured for handling the defined network protocol; and providing access for the one client computer to the at least one of the plurality of file servers using a single mount point and the namespace computer in accord with the processing by the protocol handling unit; and providing information to the one client computer on how to access the at least one of the plurality of file servers in accord with the processing by the protocol handling unit.

11. The method of claim 10, wherein the one of the plurality of client computers uses a different network protocol than the at least one of the plurality of file servers.

12. The method of claim 11, wherein the network protocol is selected from the group consisting of NFS, CIFS and FMP.

13. The method of claim 10, wherein the one of the plurality of client computers uses a same network protocol as the at least one of the plurality of file servers.

14. The method of claim 13, wherein the network protocol is selected from the group consisting of NFS, CIFS and FMP.

* * * * *